US009518670B2

(12) United States Patent
Albrecht et al.

(10) Patent No.: US 9,518,670 B2
(45) Date of Patent: Dec. 13, 2016

(54) MAIN STAGE IN-LINE PRESSURE CONTROL CARTRIDGE WITH STEPPED RETAINER COLLAR

(71) Applicants: David E Albrecht, Blue Bell, PA (US); David E Albrecht, Schwenksville, PA (US)

(72) Inventors: David E Albrecht, Blue Bell, PA (US); David E Albrecht, Schwenksville, PA (US)

( * ) Notice: Subject to any disclaimer, the term of this patent is extended or adjusted under 35 U.S.C. 154(b) by 0 days.

(21) Appl. No.: 14/738,905

(22) Filed: Jun. 14, 2015

(65) Prior Publication Data

US 2016/0040797 A1 Feb. 11, 2016

Related U.S. Application Data

(63) Continuation-in-part of application No. 13/841,558, filed on Mar. 15, 2013, now Pat. No. 9,091,355.

(51) Int. Cl.
*F16K 17/26* (2006.01)
*F16K 17/10* (2006.01)
(Continued)

(52) U.S. Cl.
CPC ........... *F16K 17/10* (2013.01); *F16K 17/04* (2013.01); *F16K 17/046* (2013.01);
(Continued)

(58) Field of Classification Search
CPC ........ F16K 17/04; F16K 17/10; F16K 17/046; F16K 17/196; F16K 17/26; F16K 27/02; G05D 7/005; G05D 7/0133; G05D 7/014; Y10T 137/0379; Y10T 137/7738; Y10T 137/7771; Y10T 137/7834; Y10T 137/7876; Y10T 137/7935; Y10T 137/7922; Y10T 137/7925; Y10T 137/7847; Y10T 137/7848; Y10T 137/7918

See application file for complete search history.

(56) References Cited

U.S. PATENT DOCUMENTS 2,583,295 A * 1/1952 Greer ............... B60T 11/32
137/514.7
3,145,732 A * 8/1964 Joles ............... F16K 47/00
137/514.3

(Continued)

FOREIGN PATENT DOCUMENTS

FR 1280679 A * 1/1962 ............. F16K 1/123

OTHER PUBLICATIONS

International search report in counterpart PCT/2016/036525, dated Sep. 29, 2016.

*Primary Examiner* — Jessica Cahill
(74) *Attorney, Agent, or Firm* — Muskin & Farmer LLC

(57) ABSTRACT

A main stage in-line pressure control cartridge. The cartridge selectively controls flow in-line in the same direction. The cartridge is mounted inside a body and has a sliding control sleeve that can expose radial holes in the poppet to an open position and to seal the radial holes in a closed position. A retainer collar is located on the opposite end of the control sleeve. Flow is permitted in a direction from the control sleeve to the retainer collar. The body has a mating recess to accommodate a step in the retainer collar which prevents movement of the retainer collar towards the control sleeve. When fluid pressure is applied to the retainer collar in the direction of the control sleeve, the step in the retainer collar presses against the body thereby preventing the fluid pressure from moving the retainer collar.

18 Claims, 45 Drawing Sheets

(51) Int. Cl.
  *F16K 17/04*    (2006.01)
  *F16K 27/02*    (2006.01)
  *F16K 17/196*   (2006.01)
  *G05D 7/01*     (2006.01)

(52) U.S. Cl.
  CPC ............ *F16K 17/196* (2013.01); *F16K 17/26* (2013.01); *F16K 27/02* (2013.01); *G05D 7/014* (2013.01); *G05D 7/0133* (2013.01); *Y10T 137/0379* (2015.04); *Y10T 137/7738* (2015.04)

(56) References Cited

U.S. PATENT DOCUMENTS

| | | | | |
|---|---|---|---|---|
| 3,635,245 | A * | 1/1972 | Canfield | F24F 3/00 137/601.05 |
| 4,051,861 | A * | 10/1977 | Ellison | F15B 13/0814 137/15.09 |
| 5,381,823 | A * | 1/1995 | DiBartolo | F16K 17/065 137/494 |
| 5,474,105 | A * | 12/1995 | Able | F16K 17/30 137/462 |
| 6,802,488 | B1 * | 10/2004 | Patterson | F16K 1/123 251/129.11 |
| 7,201,184 | B2 * | 4/2007 | Morrow | F16K 15/025 137/508 |
| 8,191,573 | B2 * | 6/2012 | Voss | F16K 17/0433 137/508 |
| 2004/0216781 | A1 * | 11/2004 | Larsen | G05D 16/106 137/505.25 |
| 2007/0095402 | A1 * | 5/2007 | Hecking | F16K 1/126 137/508 |
| 2011/0197979 | A1 * | 8/2011 | Imhof | G05D 7/005 137/528 |

* cited by examiner

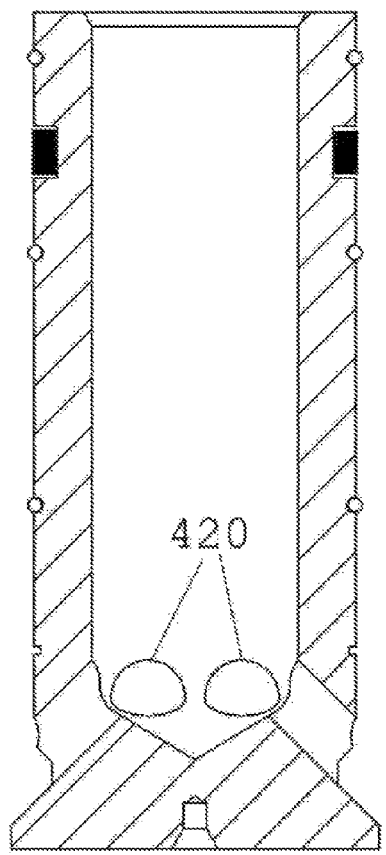
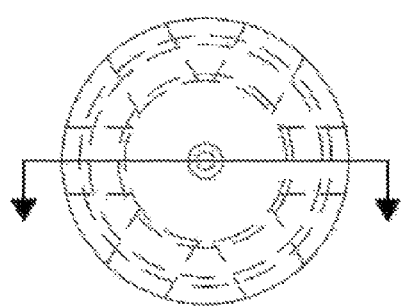
FIGURE 9C

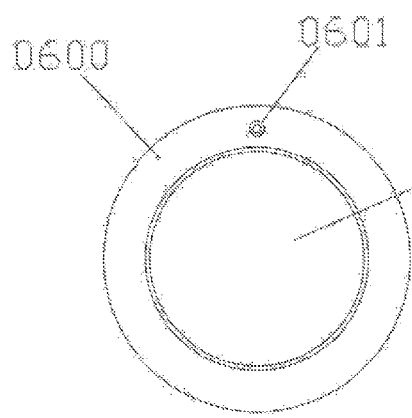
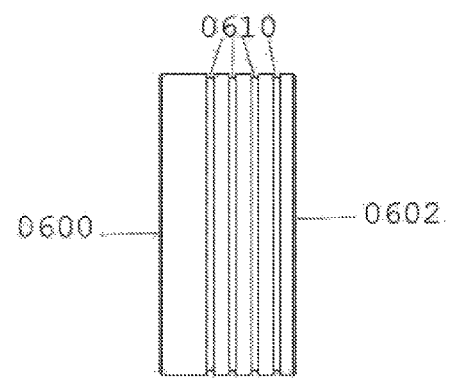
FIGURE 11A
FIGURE 11B
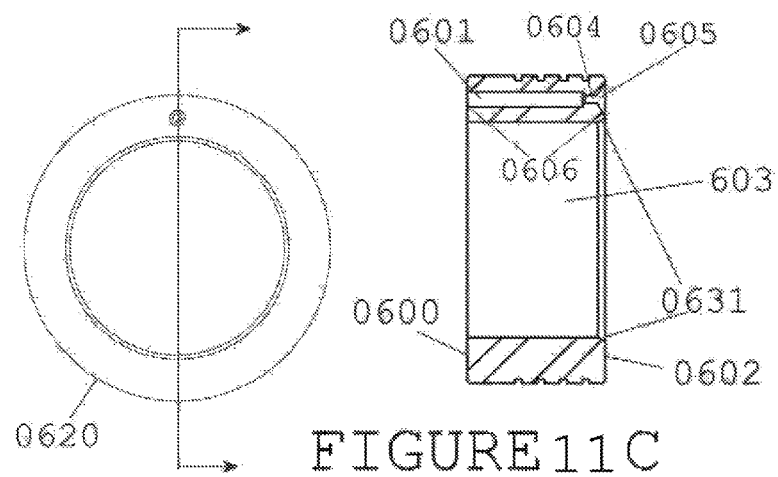
FIGURE 11C

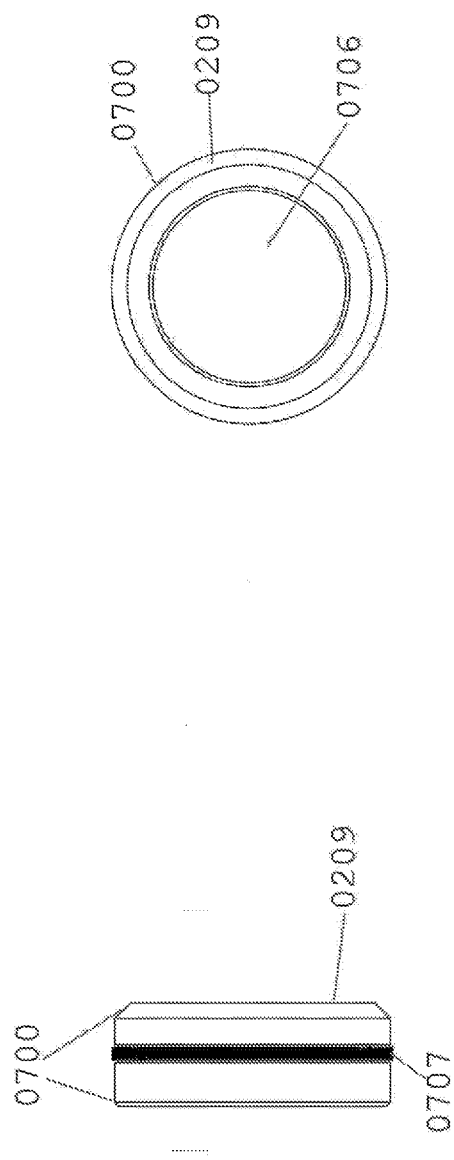
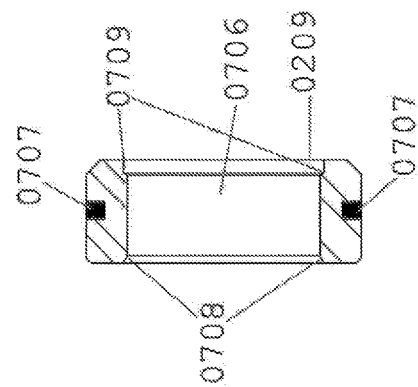
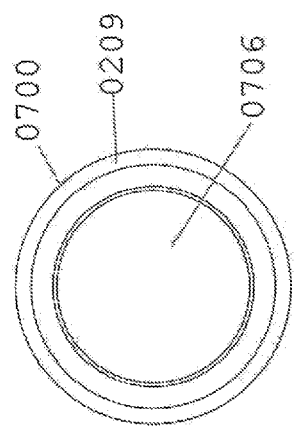
FIGURE 12B
FIGURE 12C
FIGURE 12A

NEUTRAL POSITION

MAIN STAGE IN-LINE PRESSURE CONTROL CARTRIDGE WITH STEPPED RETAINER COLLAR

CROSS REFERENCE TO RELATED APPLICATIONS

This application is a continuation in part of application Ser. No. 13/841,558 which is incorporated by reference herein in its entirety.

BACKGROUND OF THE INVENTION

1. Field of the Invention

The present general inventive concept is directed to a method and apparatus, and directed to a main stage cartridge.

2. Description of the Related Art

One trend in modern hydraulics is towards higher operating pressures in order to provide more work with a smaller actuator. There is also a desire to minimize energy consumption.

Currently, there is widespread use of hydraulic cartridge valve technology. Hydraulic cartridge valves do have high insertion losses due to small fluid passages coupled with multiple fluid directional changes Hydraulic cartridge valves in present use are either of screw-in or slip-in construction. Screw-in cartridges are threaded into a cavity. The torque required to pre-load the cartridge in its cavity can be substantial in a larger valve. For example, a screw-in cartridge valve rated for a nominal flow of 200 gpm can have a pre-load torque requirement of 375 foot-pounds.

Slip-in cartridge valves, known as 2/2 valves or logic valves, are generally held in a cavity by a cover plate retained with socket head cap screws. The pre-load torques are much lower for a given nominal flow size. Most are designed to be used within cavities defined by standards DIN 24342 and ISO 7368.

For both screw-in and slip-in cartridge valves, the typical axis of fluid discharge is offset 90 degrees from the axis of fluid inlet.

Hydraulic cartridge valves currently utilize either a poppet or spool construction. Spool type hydraulic valves have disadvantages at higher pressures due to leakage between the valve sleeve and spool. Close fits are desired to minimize (but not eliminate) leakage. Despite this leakage may be unacceptably high as system working pressures increase. This results in wasted energy and heat as high-pressure hydraulic fluid is discharged to lower pressure without doing any useful work.

Silting is also a problem. Spool valves are vulnerable to fine fluid contamination. Debris deposited between the spool and the sleeve may result in erratic valve shifting, or the valve not shifting at all. Continuous leakage is present in spool type valves, even when the valve is closed, representing a continuous loss of energy.

Therefore, what is needed is a cartridge valve that can improve upon the deficiencies of the prior art.

SUMMARY OF THE INVENTION

It is an aspect of the present invention to provide an improved in-line cartridge valve.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which:

FIG. 9C shows a cross section of a tubular poppet showing radial holes at an angle, according to an embodiment;

FIG. 11A shows a top view of the control sleeve, according to an embodiment;

FIG. 11B shows a side view of the control sleeve, according to an embodiment;

FIG. 11C shows a cross section of the control sleeve, according to an embodiment;

FIG. 12A shows a side view of a retainer collar, according to an embodiment;

FIG. 12B shows a top view of the retainer collar, according to an embodiment;

FIG. 12C shows a cross section of the retainer collar, according to an embodiment;

Figure 1:
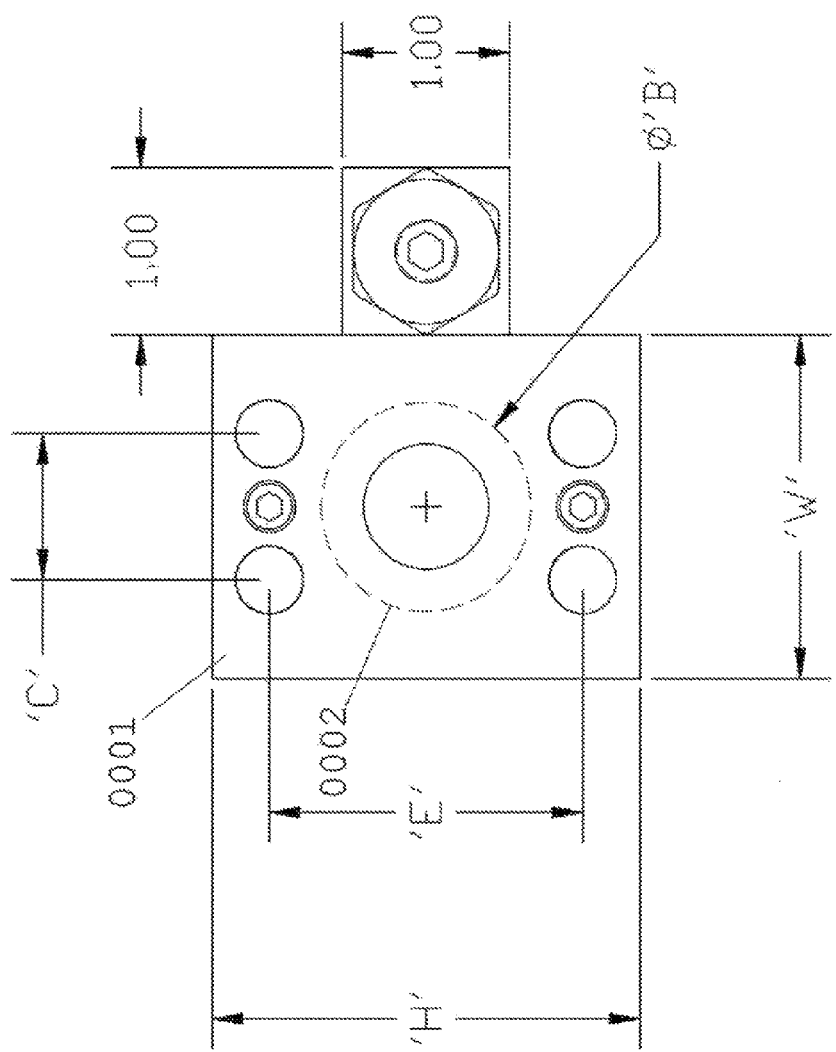
FIG. 1 shows an end view of the body with a control or pilot module, the body which receives any cartridge of the present invention, according to an embodiment.

Note that any portion of any part not explicitly shown in the drawings can be assumed to have a same structure as the visible corresponding/symmetrical portions of the part (unless such assumption would render the invention inoperative). Some figures illustrate cross-section views and (unless otherwise stated) other slices of the part(s) follow the same structure/pattern as the illustrated cross-section (unless such assumption would render the invention inoperative). Common sense can also be used to augment the figures knowing that the structure of the figures (and hence the invention) must be consistent with the stated operation(s) described herein. Thus, the figures can be augmented with any feature (described herein or not) which would be needed to render the invention operative.

DESCRIPTION OF THE PREFERRED EMBODIMENTS

Reference will now be made in detail to the presently preferred embodiments of the invention, examples of which are illustrated in the accompanying drawings, wherein like reference numerals refer to like elements throughout.

This invention is of a new pilot controlled two port straight flow thru hydraulic poppet valve with and without reverse flow capabilities. Control of the internal and external pilot flow together with control of the internal and external drain flow determines the function of the main poppet.

Note that fluid as used herein refers to any type of hydraulic fluid typically used in the art, including a fluid based on any kind of oil, mineral oil, water, and any commercially available hydraulic fluid such as SKYDROL, etc.

Existing hydraulic cartridge technology may be used to pilot or control the new main stage valve design. As the size and flow requirements of the pilot stage are small compared to the main stage, lost energy resulting from leakage and pressure drop may be minimized.

The new valve design has a positive metal-to-metal seal, and does not rely on very close clearance to minimize leakage and energy loss across the main flow stage. Larger clearances make the new valve design more resistant to the effects of dirt and contamination. The metal sealing minimizes or eliminates leakage associated with the valve in the closed position.

Socket head cap screws may be used to secure the valve in place, with relatively low pre-load torque requirements, when compared to a similarly sized screw-in cartridge.

The in-line orientation of the valve of the current invention is conducive to 'sandwiching' the main valve element between two components. Orientation of the fluid flow at the valve inlet and discharge is the same, as opposed to the 90 degree discharge offset associated with existing hydraulic cartridge designs.

Although the invention can be made to a variety of sizes, those depicted are optimized for use with the proprietary Unified Code 61 4-bolt flange standard disclosed in U.S. Pat. No. 6,715,798 (which is incorporated by reference herein in its entirety). Valves made for use with nominal port sizes 08, 12, 16, 20, 24, and 32 are made to the Unified Code 61 4-bolt standard. Sizes 40 and 48 are made to an industry Code 62 standard.

There are many advantages of putting valve and piping elements in line as stackable modular components using this standard, including but not limited to the use of high strength socket head cap screws as opposed to hex head cap screws in order to obtain higher working pressures in the same or smaller pressure containing envelope, the use of O-ring face sealing as a superior method to threaded connections, and how the use of this standard reduces leakage, labor costs, and system volume.

The valves illustrated in this patent are designed for hydraulic applications with operating pressures up to 5000 psi (350 bar). The valve assemblies described herein can be customized to further improve hydraulic systems that require other specific maximum hydraulic system pressures.

Figure 2:
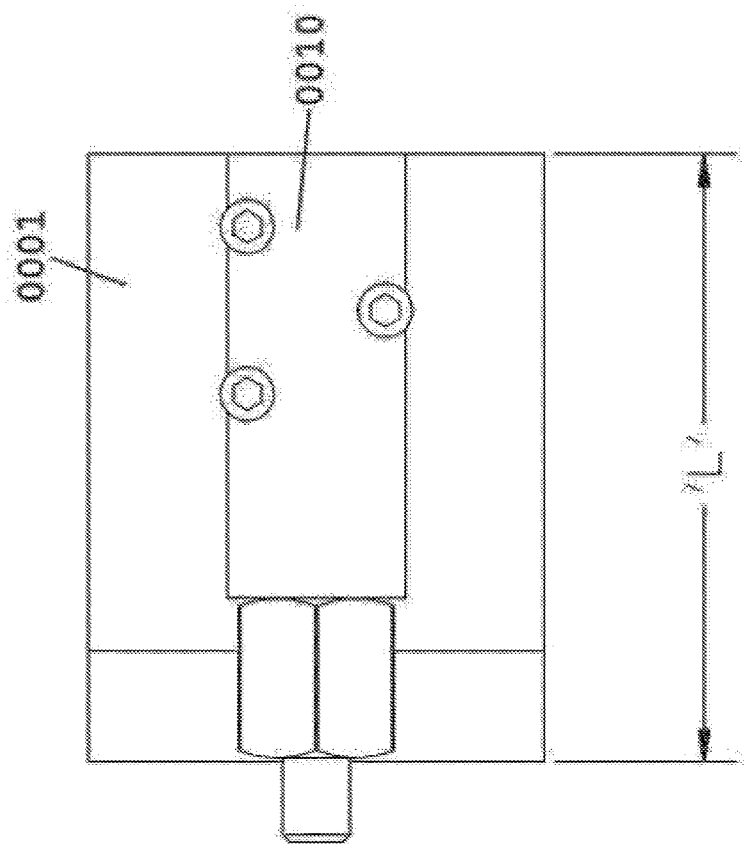
FIG. 2 shows a top view of the body with a control module, according to an embodiment.

FIG. 1 shows an end view of the body 0001 which receives (in a channel 0002 which passes through the entire body, although the bore is stepped so the diameter shown does not pass through the entire body) any cartridge of the present invention. The bolt mounting pattern shown can be a typical SAE 4-bolt mounting pattern that is common in the industry, and for which the slip in cartridges are designed for use with. FIG. 2 shows a top view of the body 0001 with a control module 0010.

The sizes of straight flow through valves made to the teaching of this invention are favorable when compared to that of 90-degree discharge slip in cartridges in common use today. FIGS. 1 and 2 show end and side view of the envelopes of valves made to the teachings of this invention, including a pilot control valve. Dimensions (in inches) corresponding to the overall valve envelope, mounting pattern, bore diameter to receive the valve cartridge, and nominal flow rating at 40 psi pressure drop, are listed in Table 1 as follows:

| NOMINAL SIZE | B | W | H | E | C | L | NOMINAL RATED FLOW (GPM) |
|---|---|---|---|---|---|---|---|
| 8 | 0.939 | 1.75 | 2.00 | 1.500 | 0.688 | 2.88 | 20.8 |
| 12 | 1.251 | 2.06 | 2.56 | 1.875 | 0.875 | 3.42 | 38.5 |
| 16 | 1.345 | 2.25 | 2.75 | 2.062 | 1.031 | 3.38 | 51 |
| 20 | 1.501 | 2.75 | 3.00 | 2.312 | 1.188 | 3.38 | 65 |
| 24 | 1.626 | 3.00 | 3.50 | 2.750 | 1.406 | 4.13 | 89 |
| 32 | 1.876 | 3.00 | 4.00 | 3.062 | 1.688 | 4.88 | 110 |
| 40 | 2.126 | 4.38 | 6.00 | 3.500 | 2.000 | 5.25 | 150 |
| 48 | 2.439 | 5.38 | 7.50 | 4.188 | 2.438 | 5.75 | 200 |

Valves made to the teachings of this invention have a higher 'power density', or a better ability to transmit horsepower for a given unit of size. This is important given the trend in the hydraulic industry, particularly the mobile hydraulic industry, to provide more power with less weight.

Figure 3:
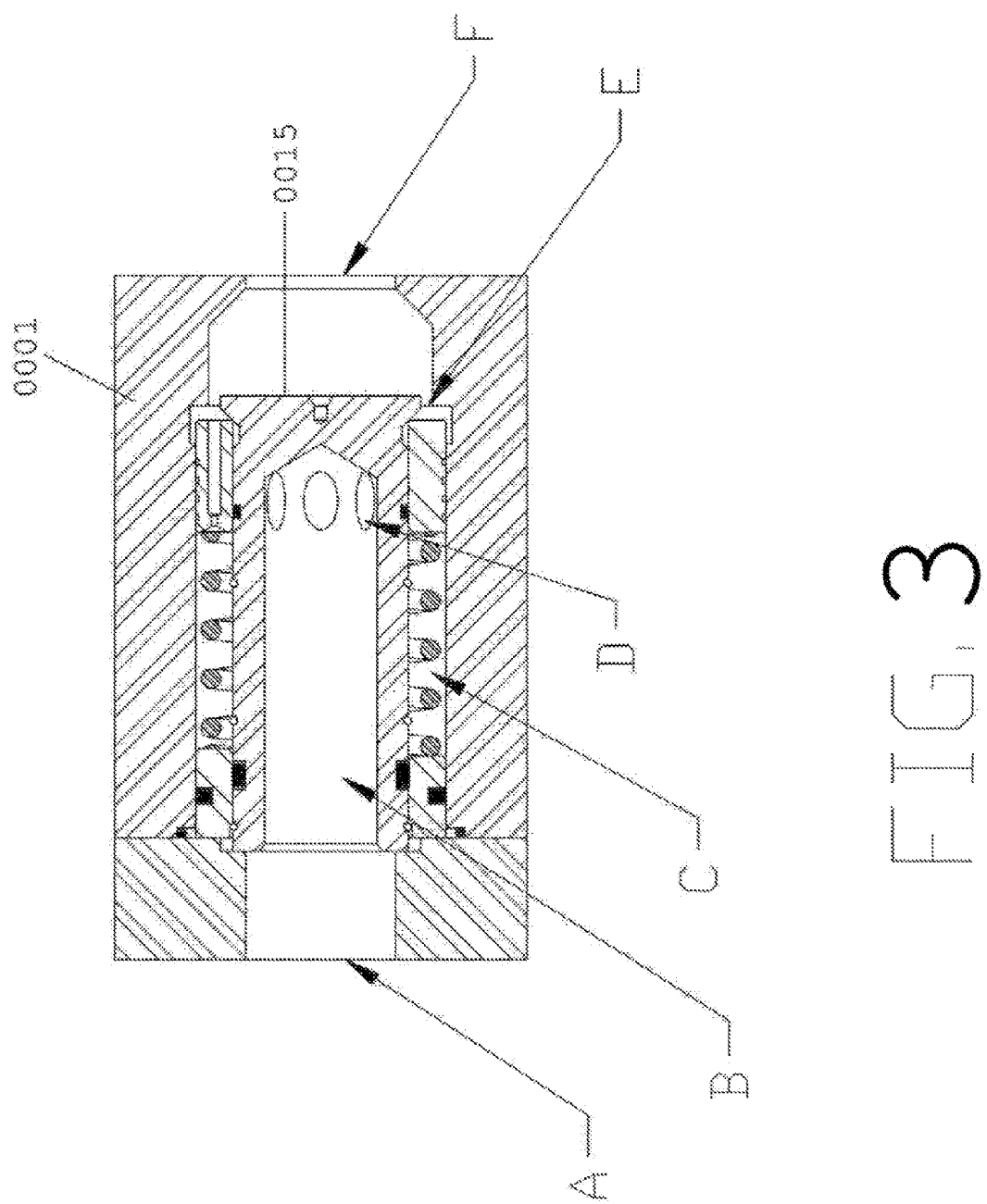
FIG. 3 shows a cross section of the body with a cartridge inserted, according to an embodiment.

FIG. 3 shows a cross section of the body with a cartridge inserted. A cartridge 0015 is inserted into the channel in the body 0001. FIG. 3 also show various nominal flow areas of slip-in cartridges made to the teachings of this invention for different nominal sizes. Table 2 is a tabular list of these areas:

| AREA (SQUARE INCHES) | | | | | | |
|---|---|---|---|---|---|---|
| NOMINAL SIZE | A | B | C | D | E | F |
| 8 | 0.221 | 0.130 | 0.353 | 0.148 | 0.109 | 0.221 |
| 12 | 0.442 | 0.249 | 0.627 | 0.259 | 0.300 | 0.442 |
| 16 | 0.518 | 0.338 | 0.681 | 0.344 | 0.392 | 0.690 |
| 20 | 0.519 | 0.442 | 0.883 | 0.443 | 0.491 | 0.887 |
| 24 | 0.785 | 0.601 | 0.969 | 0.616 | 0.614 | 1.108 |
| 32 | 1.108 | 0.887 | 1.141 | 0.742 | 0.748 | 1.623 |
| 40 | 1.485 | 1.227 | 1.476 | 1.118 | 1.010 | 2.159 |
| 48 | 2.074 | 1.623 | 1.909 | 1.571 | 1.360 | 2.761 |

Figure 5:
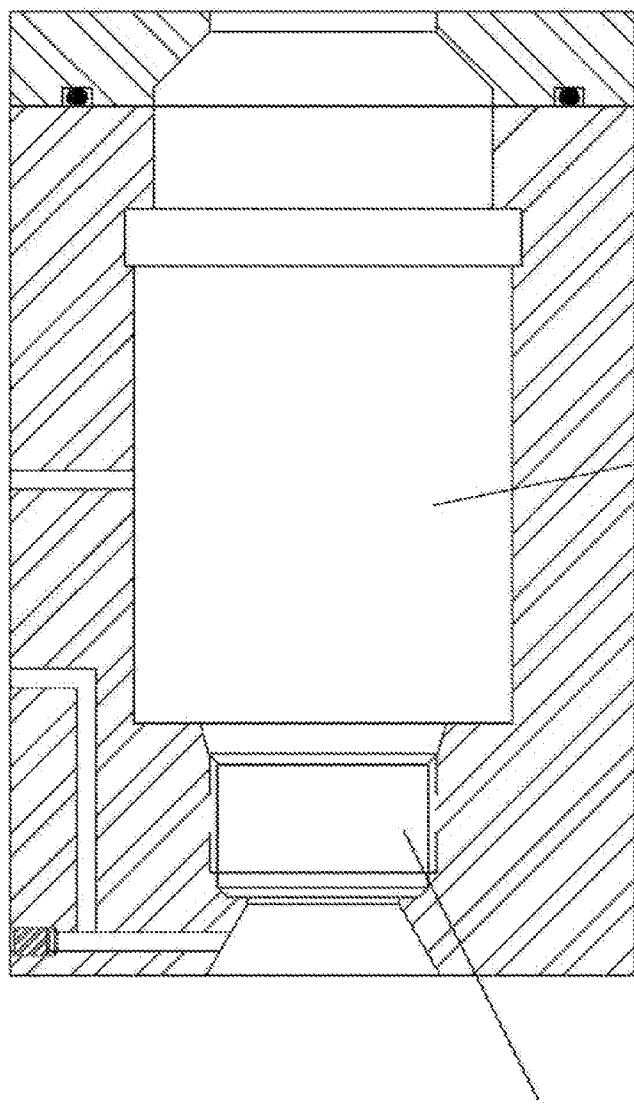
FIG. 5 shows a cross section of a body used to house a thread-in valve assembly, according to an embodiment.
Figure 6:
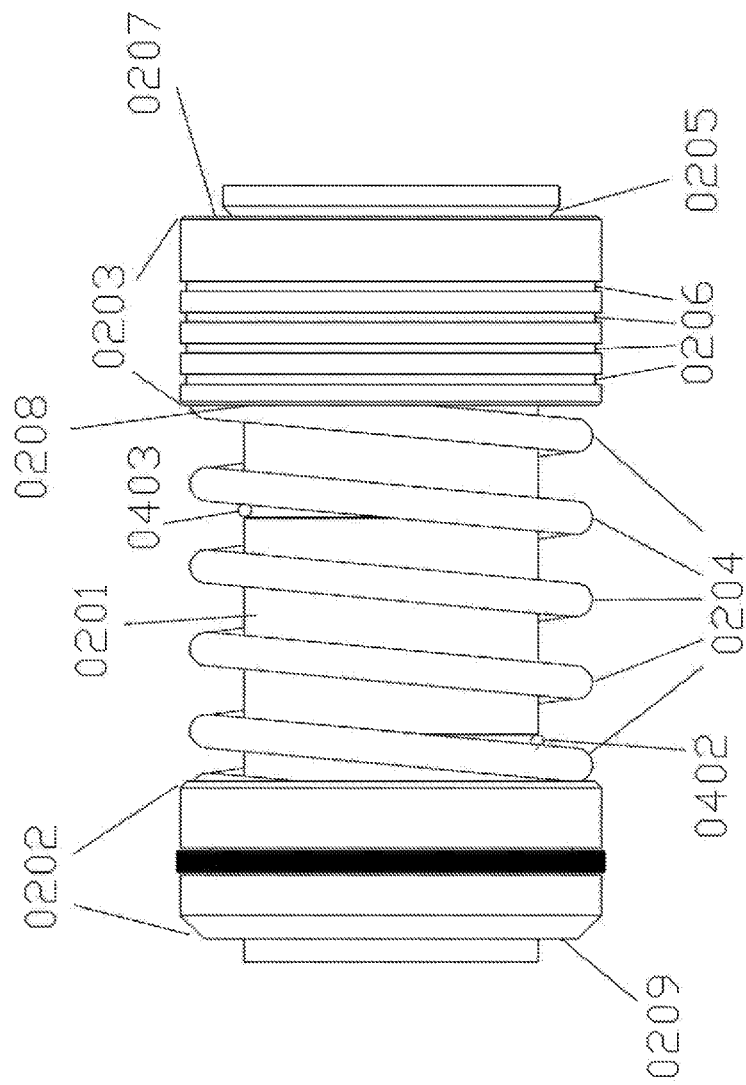
FIG. 6 shows a slip-in valve assembly, according to an embodiment.
Figure 7:
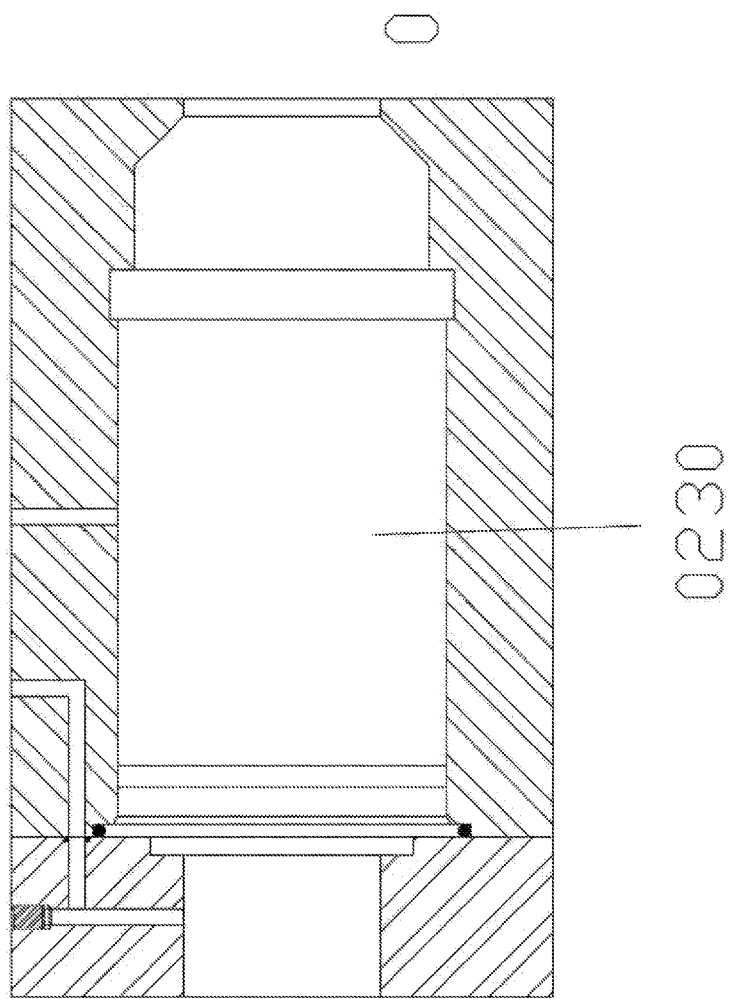
FIG. 7 shows a cross section of a body used to house a slip-in valve assembly, according to an embodiment.

In one embodiment a thread-in valve assembly is used (see FIGS. 4 and 5), while in another embodiment a slip-in valve assembly can be used (see FIGS. 6 and 7). Regardless of whether the thread-in valve assembly or the slip-in valve assembly is used, many of the components described herein can be used interchangeably with each version. The thread-in valve assembly and slip-in valve assembly can each be used for different purposes, for example the slip-in valve assembly can be used to allow for two-way flow.

Figure 4:
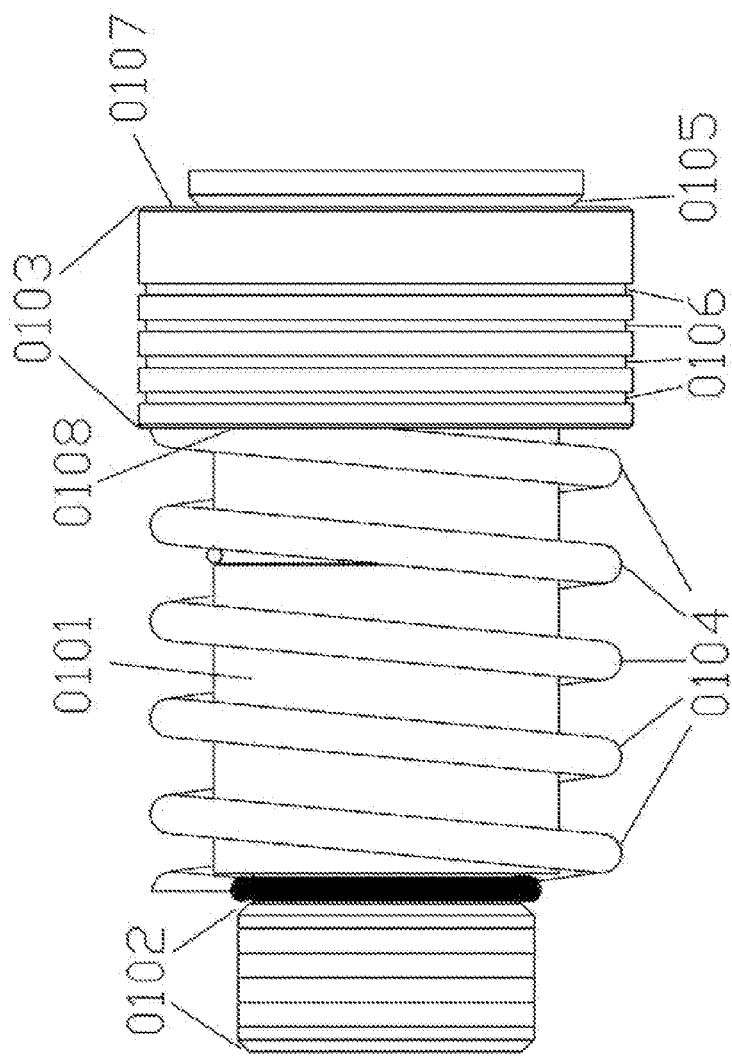
FIG. 4 shows a thread-in valve assembly, according to an embodiment.

FIG. 4 shows a thread-in valve assembly, according to an embodiment.

A tubular poppet 0101 is integrally connecting to a threaded end 0102. The threaded end 0102 and the tubular poppet 0101 have a hollow central region for fluid flow. The threaded end 0102 is configured for threaded engagement within a cooperating thread in a valve body. Alternatively, the tubular poppet 0101 can be engaged into the valve body through an interference fit or the like. A seal can be used adjacent the threaded end 0102.

The tubular poppet 0101 has an expanded end that forms a conical seat 0105 for mating opposition to the control sleeve 0103. The seat 0105 can also have a spherical or other geometry. The seat 0105 prevents any fluid inside the central region from escaping out the side opposite the side with the threaded end 102, or vice versa thus in the closed position (shown) fluid can only enter/leave the valve assembly through the threaded end 0102. Adjacent to the seat 0105 are radially oriented holes (not shown in FIG. 4) that extend from the outer diameter of the tubular poppet 0101 to the inner diameter of the tubular poppet 0101. The radially oriented holes can also be angled forward from inside to outside to improve flow characteristics. The outer diameter of the tubular poppet 0101 has limit rings (control sleeve limit ring 403, first retainer collar limit ring 401, and second retainer collar limit ring 402) to limit the movement of the control sleeve (and the retainer collar in the embodiment that uses the retainer collar, see FIG. 6).

A control sleeve 0103 abuts to a spring 0104 which wraps around the tubular poppet 0101. Oil grooves 0106 are present on the control sleeve 0103 that serve to center the control sleeve within its corresponding bore in the valve body. The control sleeve 0103 is configured to slide along the length of the tubular poppet 0101 between the seat and the limit ring 403 (see FIG. 9B). The spring 0104 is configured to naturally push the control sleeve 0103 closed (to the right in FIG. 4). Fluid pressure coming from right to left (in FIG. 4) pressing against a forward face 0107 of the control sleeve 0103 will urge the control sleeve 0103 to slide to the left towards the threaded end (when the pressure overcomes the force of the spring 0104 as well as any pressure induced force acting on face 108 of the control sleeve) and hence into an open position (not shown in FIG. 4). In the threaded embodiment, the spring is sandwiched between the control sleeve and the bottom of a control cavity in the body that the tubular poppet is located in. If the tubular poppet is removed from the body, the spring can be removed from the poppet.

The control sleeve 0103 and the tubular poppet 0101 can be hardened for wear resistance. The control sleeve 0103 is annular. The inner diameter of the control sleeve 0103 is slightly greater than the outer diameter of the tubular poppet 0101 so that the control sleeve 0103 can move axially on the tubular poppet 0101. The control sleeve 0103 has the forward face 0107, and a control face 0108. In the closed position, the internal diameter of forward face 0107 contacts a region of the tubular poppet 0101, forming a metal to metal seal, in order to prevent the flow of high-pressure fluid into the central region of the tubular poppet 0101. Note that when the control sleeve is in the closed position, the inner diameter of the control sleeve makes a tight seal with the seat 105, 205 of the poppet thereby obstructing the main channel of fluid flow from the central region through the holes and out past the control sleeve. The control sleeve 0103 can have a communication between forward face 0107 and control face 0108 (not pictured in FIG. 4). At least a portion of this communication should be a passage to throttle the flow of fluid between the two faces. The inner diameter of the control face 0108 has a limit ring stop 631 which is formed for mating abutment against a corresponding control sleeve limit ring 0403 (see FIG. 9B).

FIG. 5 shows a cross section of a body used to house a thread-in valve assembly, according to an embodiment. The channel (or cavity) 0130 in the body can be used to house the thread-in valve assembly illustrated in FIG. 4 or other variation.

Body threading 0131 can be used to screw the threaded end 0102 onto, thus the threaded end 0102 would always be pinned into the body and cannot move. Thus, when the valve assembly illustrated in FIG. 4 is inserted into the body shown in FIG. 5 (and the threaded end 0102 is screwed into the body threading 0131), the valve can operate as a check valve. Fluid would typically flow in the direction from right to left as illustrated in FIG. 5, but typically fluid would not be able to flow from left to right because there would be no mechanism to open the control sleeve this way. More details about how this operates are provided below.

FIG. 6 shows a slip-in valve assembly, according to an embodiment.

The slip-in valve assembly is similar to the thread-in valve assembly but for the replacement of the threaded end 0102 with a retainer collar 0202. In addition, the spring 0204 has a modified functionality than the thread-in valve due to the presence of the retainer collar 0202. Thus, unlike the threaded end embodiment (in which the threaded end is always pinned in place), this embodiment uses the retainer collar 0202 which is capable of sliding.

The tubular poppet 0201 has an expanded end that forms a conical seat 0205 for mating opposition to a control sleeve 0203. The seat 0205 can also have a spherical or other geometry. The seat 0205 prevents any fluid inside the central region from escaping out the end opposite the end with the retainer collar 0202, thus in the closed position (shown) fluid can only enter/leave the valve assembly through the end with the retainer collar 0202. Adjacent to the seat 0205 are radially oriented holes (not shown in FIG. 6) that extend from the outer diameter of the tubular poppet 0201 to the inner diameter of the tubular poppet 0201. The outer diameter of the tubular poppet 0201 has limit rings (control sleeve limit ring 403, first retainer collar limit ring 401, and second retainer collar limit ring 402) to limit the movement of the control sleeve (and the retainer collar in the embodiment that uses the retainer collar).

A control sleeve 0203 abuts a spring 0204 which wraps around the tubular poppet 0201. Oil grooves 0206 are present on the control sleeve 0203 that serve to center the control sleeve within its corresponding bore in the valve body. The control sleeve 0203 is configured to slide along a length of the tubular poppet 0201.

The tubular poppet 0201 has a sliding retaining collar 0202 on a first end of the tubular poppet 0201 that can slide along a portion of the outer body of the tubular poppet 0201. Movement of the retainer collar is not necessary for proper valve operation, however it can be required for valve assembly. The retainer collar 202 should be moved a distance against the spring toward the poppet seat in order to install the first retainer collar limit ring 401 (see FIG. 9B). Whether or not the retainer collar actually moves along the poppet during use depends on the spring rate. To install the first retainer collar limit ring 401 requires that the retainer collar be pushed against the spring to expose the groove for first retainer collar limit ring 401. After the ring is installed, the retainer collar can be released, and will rest opposed to first retainer collar limit ring 401 by being pushed by the spring. The first retainer collar limit ring is not visible, nor accessible, when in this position. Thus, the retainer collar should be moved out of the way.

The spring 0204 is interposed between the control sleeve 0203 and the retainer collar 0202 and is configured to naturally push the control sleeve 0203 closed (to the right in FIG. 4) and also push the retainer collar 0202 to the end opposite the control sleeve 0203 (to the left in FIG. 6). Any movement of the control sleeve 0203 and the retainer collar 0202 has to overcome the force of the spring 0204.

Figure 14:
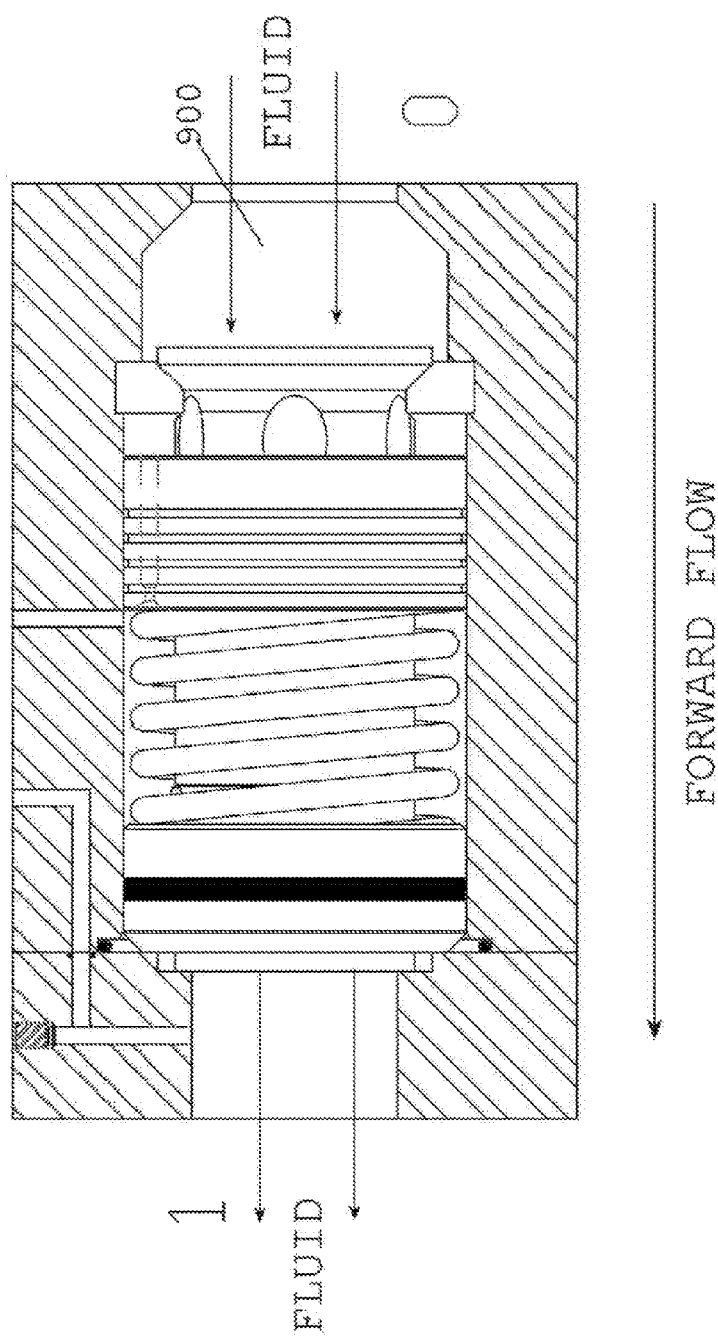
FIG. 14 shows a cross section of a slip-in valve assembly inside a body with forward flow, according to an embodiment.

Assuming the poppet is secured such that it cannot itself move in the left direction (in FIG. 6), pressure coming from right to left (in FIG. 6) pressing against a forward face 0207 of the control sleeve 0203 would urge the control sleeve 0203 to slide to the left (when the pressure overcomes the force of the spring 0204 and any force resulting from pressure applied to control face 0208) and hence into an open position (exposing the radial holes, not shown in FIG. 6) while the position of the retainer collar cannot move further to the left (see FIG. 14). When pressure is applied to the outward retainer face 0209 and to the inside diameter and left end (in FIG. 6) of the tubular poppet (from left to right in FIG. 6), the retainer collar 0202 (and hence the poppet) will be urged towards the control sleeve 0203 (to the right in FIG. 6). In addition, pressure on the inside and end of the poppet will push the seat and thus the tubular poppet to the right direction which will also bring the retainer collar 0202 along in the right direction as well (since the first retainer collar limit ring 0401 will force the retainer collar 0202 to move along with the poppet) and compress the spring. Pressure acting from the left to right direction (in FIG. 6) will also act on outward retainer face 209 urging it to the right (towards the control sleeve). Whether or not the retainer collar is "dragged" along by the tubular poppet is a function of the sum of the forces on the retainer (pressure forces and spring force).

Shown on the outside perimeter of the tubular poppet 0201 is control sleeve limit ring 0403 (prevents the control face 0208 of the control sleeve 0203 from moving too far along the tubular poppet 0201 past the control sleeve limit ring 0403). The second retainer collar limit ring 0402 prevents the retainer collar 0202 from moving further along the poppet past the second retainer collar limit ring 0402).

First retainer collar limit ring 0401 is not shown in FIG. 6 because it is blocked by the retainer collar 0202, but serves the purpose to prevent the retainer collar 0202 from sliding off the tubular poppet 0201.

The control sleeve 0203 is annular. The inner diameter of the control sleeve 0203 is slightly greater than the outer diameter of the tubular poppet 0201 so that the control sleeve 0203 can move axially on the tubular poppet 0201. The control sleeve 0203 has a forward face 0207, and a control face 0208. The internal diameter of forward face 0207 contacts the expanded region of the tubular poppet 0201 thereby forming a metal to metal circular sealing interface. There should be some clearance necessary between the inner diameter of the control sleeve and the outer diameter of the tubular poppet in order to allow them relative movement. This same clearance is also a leakage path. Although covering the holes 300 in the tubular poppet by the control sleeve will impede flow, the true sealing (flow obstruction) occurs between the circular edge of the inner diameter of the control sleeve where it contacts the sealing surface of the tubular poppet (the closed position). This contact between the forward face 0107, 0207 of the control sleeve and the seat 0105, 0205, of the tubular poppet is completely sealed thereby preventing all fluid flow there between. The control sleeve 0203 can have a communication (passage) between forward face 0207 and control face 0208 (not pictured in FIG. 6) to throttle the flow of fluid between the two faces. The inner diameter of the control face 0208 has a limit ring stop 0631 which is actually recessed from control face 0208 which is formed for mating abutment against a corresponding control sleeve limit ring 0403.

Note in some embodiments there can be leakage between the outer diameter of the poppet 0201 and the inner diameter of the control sleeve 0203. This is because in order to allow for there to be room for the control sleeve 0203 to slide along the poppet 0201, there must be a slight space there between. This type of space is a "leakage path" and it is possible that (without the user of a poppet seal 820) a relative small volume of fluid can pass between one end of the control sleeve 0203 between the retainer collar and the poppet 0201 through this leakage path and out the other end of the control sleeve 0203. However, the amount of fluid that can navigate this leakage path is relatively miniscule (and at very low pressure) as there is only a tiny space between the control sleeve 0203 and the poppet 0201. An optional poppet seal 820 can be used to completely block this leakage path, see FIG. 13. Any leakage path is a restrained path because the space the fluid has to flow through is so slight compared with the main flow path (this will be discussed below in more detail).

FIG. 7 shows a cross section of a body used to house a slip-in valve assembly, according to an embodiment. The channel (or cavity) 0230 in the body can be used to house the slip-in valve assembly illustrated in FIG. 6 or other variation.

Note that when the poppet is placed (housed) in the body, they are both configured such that the poppet has room in the body to slide through the control sleeve (in the right direction in FIGS. 6, 7) (thereby moving the seat rightward and away from contact on the inner diameter of forward face 0207 of the control sleeve) when the spring is compressed (see FIG. 16) but the poppet cannot move in the left direction (in FIGS. 6, 7) relative to the retainer collar (see FIG. 14).

Note that all parts shown in FIGS. 4 and 5 and all other figures (including but not limited to the tubular poppet 0101,0201, retainer collar 0103, 0203, oil grooves 0106, 0206, seat 0105, 0205, control face 0108, 0208, forward face 0107, 0207) can be identical with the same function and can be used interchangeably herein. In fact all parts shown or described for the slip-in assembly can be used for the thread-in assembly (and vice-versa) without limitation, but for the threaded end 0102 (which is used for the thread-in assembly) and the retainer collar 0202 (which is used for the slip-in assembly) which are the main differences between the two versions. All features described herein can be used with any type of assembly (threaded, slip-in, or any other).

Figure 8:
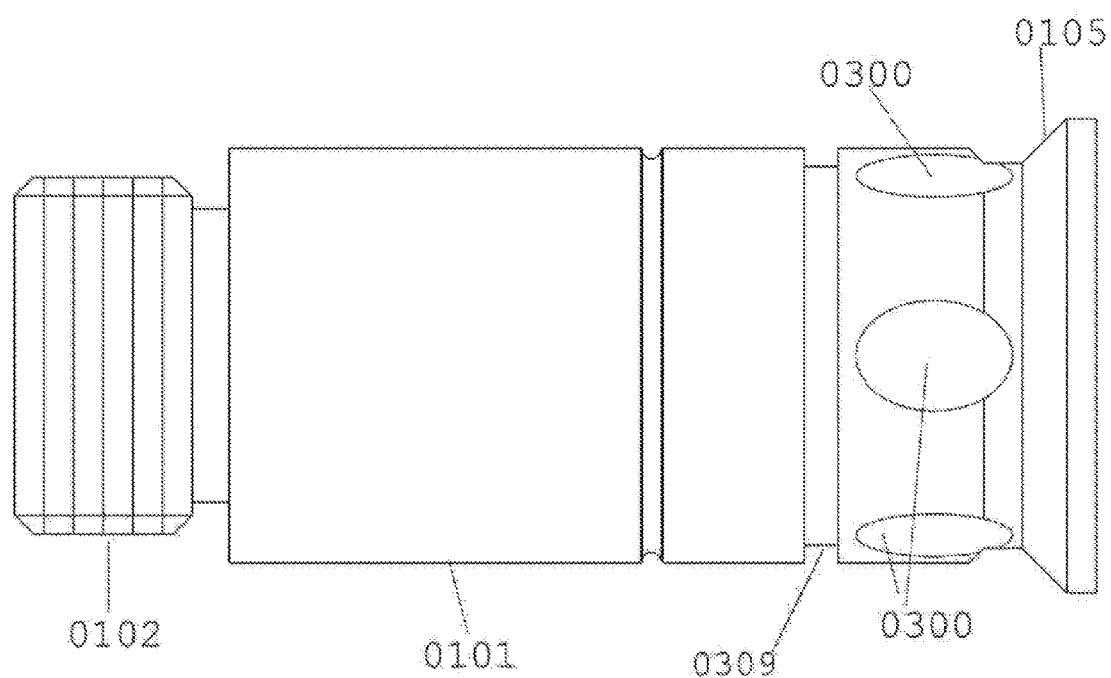
FIG. 8 shows a tubular poppet of a thread-in assembly, according to an embodiment.

FIG. 8 shows a tubular poppet for use with a thread-in assembly, according to an embodiment.

The threaded end 102 is formed on to the tubular poppet 0101 which has radial holes 0300 at an end of the tubular poppet 0101 closest to the seat 0105. Note that there can be any number of holes (one or more) in any shape or configuration and are also referred to herein as a "hole set." When the control sleeve (not pictured in FIG. 8) is in the closed position (all the way to the right in FIG. 8), the radial holes 0300 are covered by the control sleeve and thus fluid cannot flow through the radial holes 0300 because of a fluid-tight seal between the forward face 107, 207 of the control sleeve and the seat of the poppet (in which outward force from the spring helps form and maintain this seal). When the control sleeve is in the open position (wherein at least some of the radial holes 0300 are exposed) then fluid can flow through the radial holes 0300 and out of the entire assembly. Second poppet seal groove 0309 is used in the embodiment where a second poppet seal 0820 is used in order to hold the second poppet seal 0820. In the embodiment where the second poppet seal 0820 is not used, then instead of the second poppet seal groove 0309 there can be poppet oil groove 0419 (see FIG. 9B).

Figure 9A:
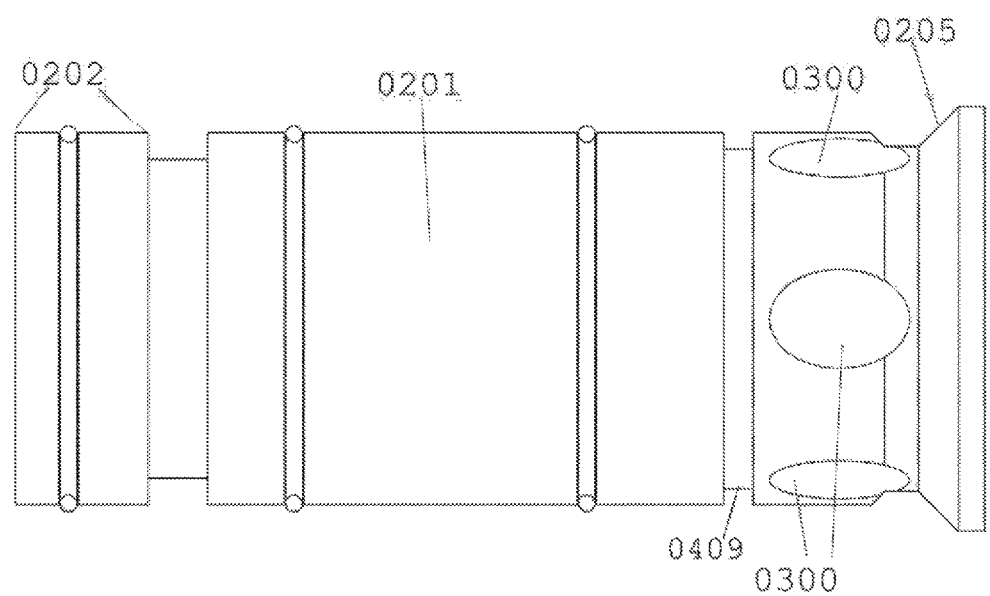
FIG. 9A shows a slip-in tubular poppet without a retainer collar control sleeve, or spring, according to an embodiment.

FIG. 9A shows a slip-in tubular poppet without a control sleeve, retainer collar, or a spring, according to an embodiment.

Retainer collar (not shown in FIG. 9A) would slidably attach to tubular poppet 0201 which has radial holes 0300 at an end of the tubular poppet closet to the seat 0205. When the control sleeve (not shown in FIG. 9A) is in the closed position (all the way to the right in FIG. 9A), the radial holes 0300 are covered by the control sleeve and thus fluid cannot flow through the radial holes 0300 because of the tight seal between the control sleeve and the poppet which prevents fluid from flowing there between. Leakage from the control chamber into the hole set, and vice versa, may be prevented by seal 820 (not shown in FIG. 9A). When the control sleeve is in the open position (wherein at least some of the radial holes 0300 are exposed and the seal is broken) then fluid can continue to flow through the radial holes 0300 (in either direction) and continue flowing. Second poppet seal groove 0409 is used in the embodiment where a second poppet seal 0820 is used in order to hold the second poppet seal 0820. In the embodiment where the second poppet seal 0820 is not used, then instead of the second poppet seal groove 0409 there can be poppet oil groove 0419 (see FIG. 9B).

Figure 9B:
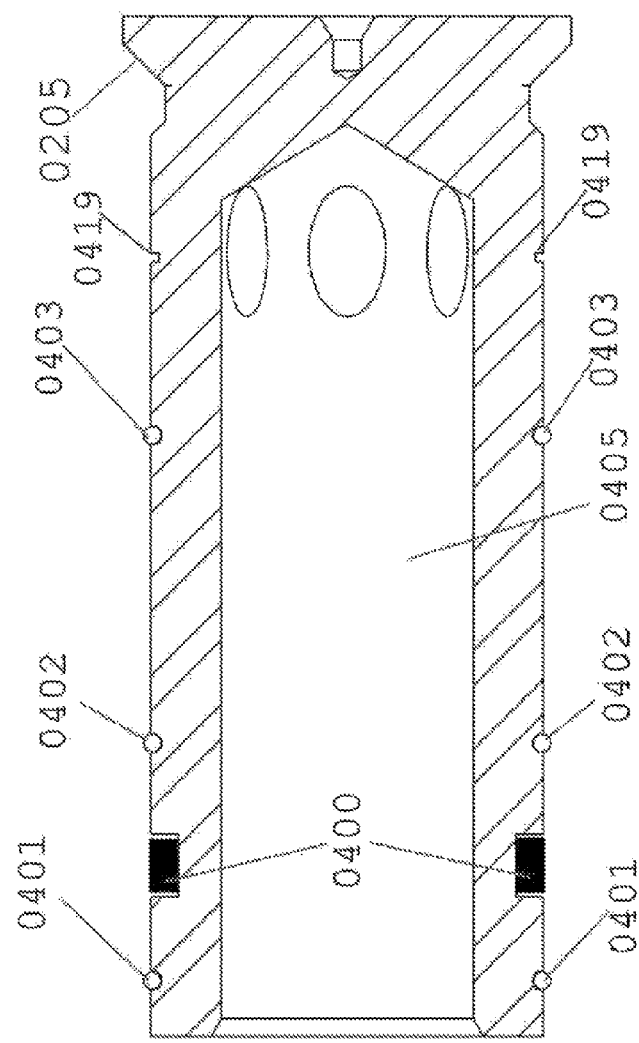
FIG. 9B shows a cross section of a tubular poppet, according to an embodiment.

FIG. 9B shows a cross section of a tubular poppet, according to an embodiment. Note that this is a cross section (like most figures herein) and the parts shown all "wrap around" in a circular fashion. Thus, for example a first poppet seal 0400 is actually circular (e.g., a ring). The first retainer collar limit ring 0401, the second retainer collar limit ring 0402, and the control sleeve limit ring 0403 are also all rings. A central region 0405 is used for flow of fluid.

The first poppet seal 0400 abuts the retainer collar and is used to seal a control chamber (not shown in FIG. 9B) from fluid entering between the inner diameter of the retainer collar and the outer diameter of the poppet and can be made out of rubber, silicone, or any other material that can be used as a sealant.

A first retainer collar limit ring 0401 is used to stop a retainer collar (not shown in FIG. 10) from sliding (in the left direction in FIG. 10) past the first retainer collar limit ring 0401. A second retainer collar limit ring 0402 is used to stop a retainer collar from sliding (in the right direction in FIG. 10) past the second retainer collar limit ring 0402 (a retainer collar stopping point). A control sleeve limit ring 0403 is used to stop a control sleeve (not shown in FIG. 10) from sliding past the control sleeve limit ring 0403 (in the left direction in FIG. 10). The control sleeve would be stopped from sliding (in the right direction in FIG. 10) by the seat. Also shown is poppet oil groove 0419.

FIG. 9C shows a cross section of a tubular poppet showing radial holes at an angle, according to an embodiment.

Two radial holes 0420 are shown. Also shown on the bottom are the nose and the view of the cross section shown.

Figure 10:
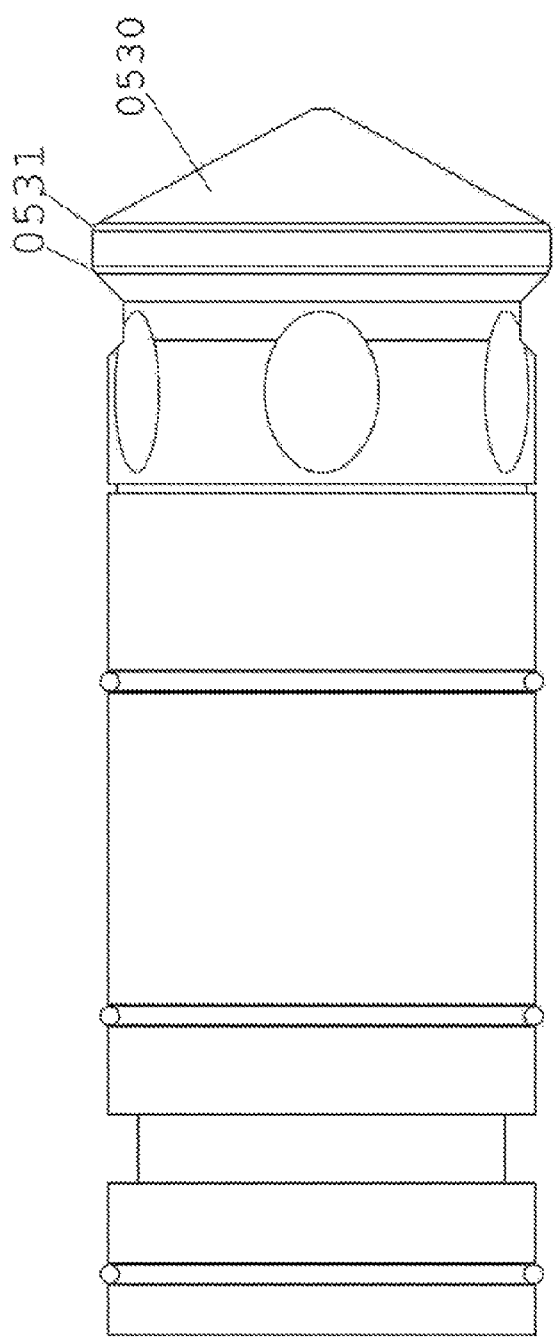
FIG. 10 shows a slip-in tubular poppet without a retainer collar, control sleeve, spring or seal, with a cone-shaped nose, according to an embodiment.

FIG. 10 shows a slip-in tubular poppet without a retainer collar or a control sleeve with a cone-shaped nose, according to an embodiment.

A cone-shaped nose 0530 has radii 0531. This construction can be preferable from a fluid dynamics perspective.

FIG. 11A shows a top view of the control sleeve, according to an embodiment.

Forward face 0600 of the control sleeve (same as control sleeve 0103, 0203) is typically positioned on the tubular poppet facing the seat (opposite the threaded end or the retainer collar) and contains a passage 0606. The passage 0606 extends between the two faces of the control sleeve (the forward face 0600 and the control face 0602) and allows fluid to flow there between (in either direction).

FIG. 11B shows a side view of the control sleeve, according to an embodiment.

Forward face 0600 (same as 0107, 0207) is opposite control face 0602 (same as 0108, 0208). Oil grooves 610 are the same as oil grooves 0106, 0206.

FIG. 11C shows a cross section of the control sleeve, according to an embodiment.

Cross section diagram 620 shows the actual cross section of the control sleeve illustrated in FIG. 11C. The passage 0606 comprises an aperture 0601, an orifice 0604, and an expanded area 0605. The aperture 0601 allows fluid to flow in from the forward face 0600 and allows fluid to flow through the aperture 0601 to the orifice 0604. The orifice 0604 can have a reduced diameter (in comparison to the diameter of the aperture 0601) in order to throttle the flow of fluid. The orifice 0604 connects to the conical opening 0605 which is an expanded area with a chamfered conical opening which can prevent the spring 0104 from obstructing flow out of the orifice 0604. Thus fluid can flow from the forward face 0600 through the aperture 0601 through the orifice 0604 and out the conical opening 0605, or it can flow in the reverse direction as well. While FIG. 11C illustrates the aperture 0601 having a constant diameter, this is not required and the aperture 0601 can have a varying diameter. Control sleeve opening 0603 is an opening which fits onto the tubular poppet. It is noted that the passage 0606 can take many forms and the orifice 0604 and/or the conical opening 0605 can be optional, as long as fluid is enabled to flow through the passage 0606 from one side of the control sleeve to the other. Control sleeve opening 0603 is an opening which fits onto the tubular poppet.

Aperture 601 is part of the passage 0606 which runs throughout the entire control sleeve so that fluid can flow in one side and out the other (typically in the aperture 0601 on the forward face 0600 and out the conical opening 605 in the control face 0602 into the control chamber, although fluid can flow in the reverse direction as well). The passage 0606 is open at both sides so that fluid can travel through the control sleeve in either direction.

It is noted that the passage 0606 in the control sleeve can be optional, and any embodiment described herein can have the passage 0606 or not have one (which means where the passage 0606 is illustrated would be solid so as not to allow flow therein).

Limit ring stop 0631 cooperates with the control sleeve limit ring 0403 to stop the control sleeve from sliding further along the tubular poppet in the direction opposite the seat. Control sleeve opening 0603 is an opening with a slightly larger diameter than the outer diameter of the tubular poppet so it can fit over the tubular poppet and slide as described herein.

While the drawing in FIG. 11C is a cross section and "wraps around" the circular control sleeve, note that the passage 0606 (comprising the aperture 0601, orifice 0604, and conical opening 0605) does not "wrap around" and exists as a hole going through the control sleeve (as illustrated in FIG. 11A).

The diameter of the conical opening 0605 on control face 0602 should preferably be greater than the wire size of the spring 0104 so that the spring 0104 does not block flow through the orifice. A chamfer can be used to accomplish this.

FIG. 12A shows a side view of a retainer collar, according to an embodiment.

Retainer collar 0700 (same as retainer collar 0202) has forward face 0209 which faces away from the control sleeve (thus fluid flowing against the retainer collar 0700 coming from outside of the body but not from the central region would exert pressure against the forward face 0209). Retainer collar seal 0707 is used to seal the control chamber so that fluid does not leak in and out of the control chamber between the outer diameter of the retainer collar 700 and the inner diameter of the corresponding bore in the valve body (cavity). All seals used herein can be made of a material such as rubber, silicone, etc. and are used to seal potential leakage paths.

FIG. 12B shows a top view of the retainer collar, according to an embodiment.

Retainer opening 0706 is a hollow section inside the retainer collar 0700 adapted to fit over the tubular poppet so the retainer collar 0700 can slide along a portion of the length of the tubular poppet.

FIG. 12C shows a cross section of the retainer collar, according to an embodiment. A first limit ring stop 0709 cooperates with the first retainer collar limit ring 0401 (see FIG. 10) to prevent the retainer collar 0700 from sliding off the tubular poppet. A second limit ring stop 0708 cooperates with the second retainer collar limit ring 0402 (see FIG. 9B) to prevent the retainer collar 0700 from sliding too far along the tubular poppet towards the control sleeve. The retainer opening 0706 is an opening with a diameter slightly larger than the outer diameter of the tubular poppet so that the retainer collar 0700 can fit onto the tubular poppet and slide.

Figure 13:
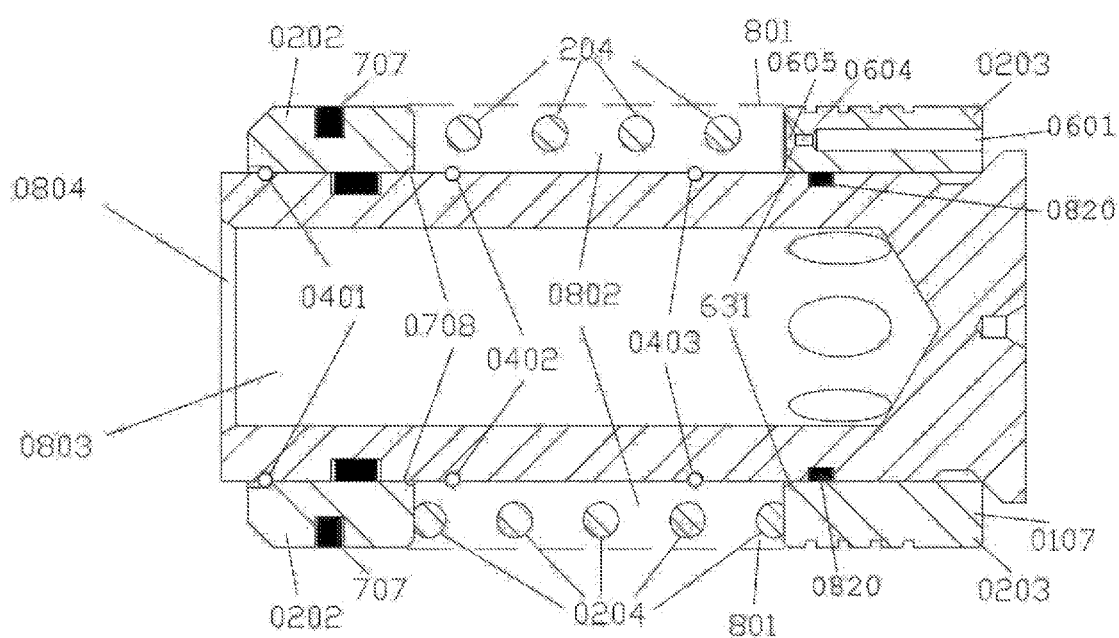
FIG. 13 shows a cross section of the tubular poppet with the retainer collar, control sleeve, and spring, according to an embodiment.

FIG. 13 shows a cross section of the tubular poppet with the retainer collar and the control sleeve, according to an embodiment.

The retainer collar 202, control sleeve 203 and spring 204 (and other parts such as the radial holes, etc.) as described herein are shown. Note how the first limit ring stop 0709 (see FIG. 12) cooperates with the first retainer collar limit ring

0401 (see FIG. 9B) to prevent the retainer collar 0700 from sliding off the tubular poppet. A second limit ring stop 0708 (see FIG. 12) cooperates with the second retainer collar limit ring 0402 (see FIG. 9B) to prevent the retainer collar 0700 from sliding too far along the tubular poppet towards the control sleeve. Limit ring stop 0631 cooperates with the control sleeve limit ring 0403 to stop the control sleeve from sliding further along the tubular poppet in the direction opposite the seat.

Note that the control sleeve 0203 is currently in the closed position and thereby the radial holes are covered by the control sleeve 0203 and sealed by interaction between the control sleeve 0203 and the seat of the poppet. When the control sleeve 0203 slides into the open position (to the left in FIG. 13) from the closed (sealed) position, the inner diameter of the control sleeve comes off of the seat on the poppet, and the radial holes are exposed (in their entirety or at least a portion) and the seal is opened/broken permitting fluid to flow from the side of the forward face through the central region 0803 of the poppet and out a tubular poppet opening 0804 wherein the fluid would then flow through the body onto the next part of a hydraulic circuit.

Without any pressure against the forward face 0107, the spring 0204 naturally urges the control sleeve 0203 into the closed position. The spring 0204 will also naturally urge the retainer collar 0202 in a direction opposite the control sleeve.

The dashed line 0801 shows the diameter of the channel in the body that the valve assembly is inserted into (see FIG. 1, channel 0002 which is also labeled as dia 'B' in FIG. 1). A control chamber 0802 is a hollow volume that surrounds the tubular poppet. In other words, the control chamber 0802 exists in the region between the tubular poppet and the channel (which would have a toroid with a square cross section shape). The control chamber 0802 is a volume which is sealed on one end by the retainer collar (including retainer collar seal 707) and is closed on the other end by the control sleeve. Aside from potential leakage between the outer diameter of the control sleeve and the inner diameter of the valve body bore, the only path for fluid in/out of the control chamber (not including any pilot paths which are not shown in FIG. 13) is the passage (which comprises the aperture 0601, orifice 0604, and conical opening 0605). Note that there is a potential leakage path between the outer diameter of the control sleeve and the inner diameter of the valve body bore when the control sleeve does not have an outside diameter seal like the retainer collar. Note that in an embodiment control sleeve seals 1601 can be used on the control sleeve to prevent this leakage (see FIG. 24). In any embodiment described herein, seals on the control sleeve may or may not be used.

The purpose of the control chamber is to receive pressure that is against the forward face 0107 by receiving the pressurized fluid through the passage 0606. The pressure inside the control chamber when the valve is in the closed position should approximately equal the pressure exerted onto the forward face 0107 therefore making it difficult if not impossible for the control sleeve to open (without any other external forces). Therefore, the fluid in the control chamber can be used in numerous ways depending on the function of the cartridge. For example, a pressure relief pilot valve can be connected to the control chamber so that only when the pressure inside the control chamber exceeds a certain amount, the control chamber would be drained thereby lowering the pressure in the control chamber thus permitting the control sleeve to slide to the open position. Or the control chamber can be connected to an externally piloted valve so that upon a signal the externally piloted valve can open (or close) thus draining the control chamber and causing the control sleeve to open.

Second poppet seal 0820 (which is actually a ring like the other seals) can be used to seal any leakage between the outer diameter of the poppet and the inner diameter of the control sleeve 0203. If the second poppet seal 820 is not used then the poppet would not have the second poppet seal groove 0409 (see FIG. 9A) but instead would have the poppet oil groove 0419 (see FIG. 9B). Any of the seals described herein can be used or omitted in any embodiment described herein in any combination. Seals are typically used to control leakage paths, and may be desirable (will prevent leakage) or less desirable (can cause more friction and wear) based on the valve function.

FIG. 14 shows a cross section of a slip-in valve assembly inside a body with forward flow, according to an embodiment.

In FIG. 14, the fluid flows from right to left in the forward direction (from face 0 to face 1). In this example, the fluid enters the tubular poppet from an outside of the tubular poppet 900 (near the control sleeve end), flows through the hole set, through the central region, and exits out the end of the tubular poppet opposite the control sleeve (at face 1). The fluid exerts enough pressure onto the forward face which overcomes the resistance of the spring and pushes the control sleeve into the open position, thereby exposing the radial holes. Note that the retainer collar does not move even though the control sleeve is pushed open. The fluid then freely flows into the radial holes and through the central region of the tubular poppet and out the tubular poppet opening. Thus, the opening of the control sleeve creates an unrestrained main channel of fluid flow between the central region and an outside of the poppet through the hole set. This is considered an unrestrained main channel because there is a relatively good amount of clearance for the fluid to freely flow as intended so the fluid can effectuate its purpose in the hydraulic circuit. Note that there are a number of potential leakage paths in the valve assembly. All potential leakage paths can be sealed by using optional seals. In some embodiments, no seals (or some but not all) are used thereby enabling fluid to flow through available leakage paths. For example, leakage paths can potential exist: i) between the inner diameter of the retainer collar and the outer diameter of the poppet; ii) between the outer diameter of the retainer collar and the inner diameter of the bore in the body used to house the valve assembly; iii) between the inner diameter of the control sleeve and the outer diameter of the poppet; iv) between the outer diameter of the control sleeve and the inner diameter of the bore in the body used to house the valve assembly. Note that all such leakage paths are restrained. That is, the clearance between the two adjacent parts in any leakage path is extremely slight and does not allow for significant fluid flow there between when compared with the main flow path of the valve.

Figure 15:
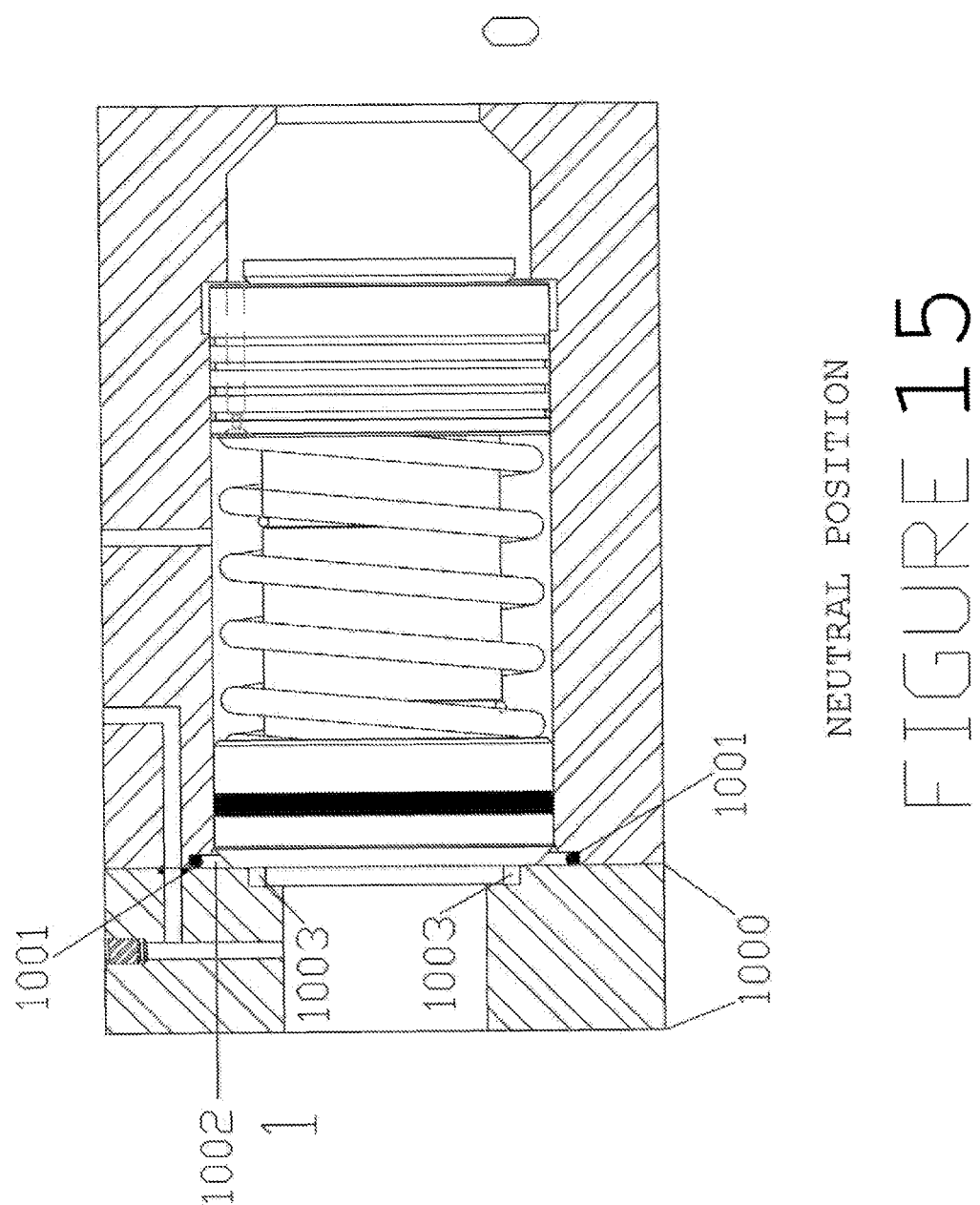
FIG. 15 shows a cross section of a slip-in valve assembly inside a body in a neutral position, according to an embodiment.

FIG. 15 shows a cross section of a slip-in valve assembly inside a body in a neutral position, according to an embodiment. The control sleeve is in the closed position.

Either no fluid enters from the control sleeve end or fluid does enter from the control sleeve end (from face 0 flowing towards face 1) but not with enough pressure to open the control sleeve (e.g., the closing force of the spring is greater than the fluid pressure on the forward face). In either case, the control sleeve remains in the closed position and the retainer collar also does not move (stays in its position at the end of the tubular poppet opposite the control sleeve). This is the neutral position.

Also shown in FIG. 15 (and other figures) is end cap 1000. The end cap 1000 is the plate of steel or other suitable material that mates with the valve body and is retained by screws. It holds the slip-in assembly within its cavity in the valve body. There is a face sealing O-ring 1001 around the perimeter of a bore in the valve body that contacts an opposing face of the end cap to prevent leakage. An O-ring groove 1002 is a groove where the O-ring is located. Annular space 1003 is an annular space defined on the outer diameter by the end cap and the inner diameter by that portion of the poppet that extends beyond the outward face of the limit collar (also referred to as retainer collar).

Figure 16:
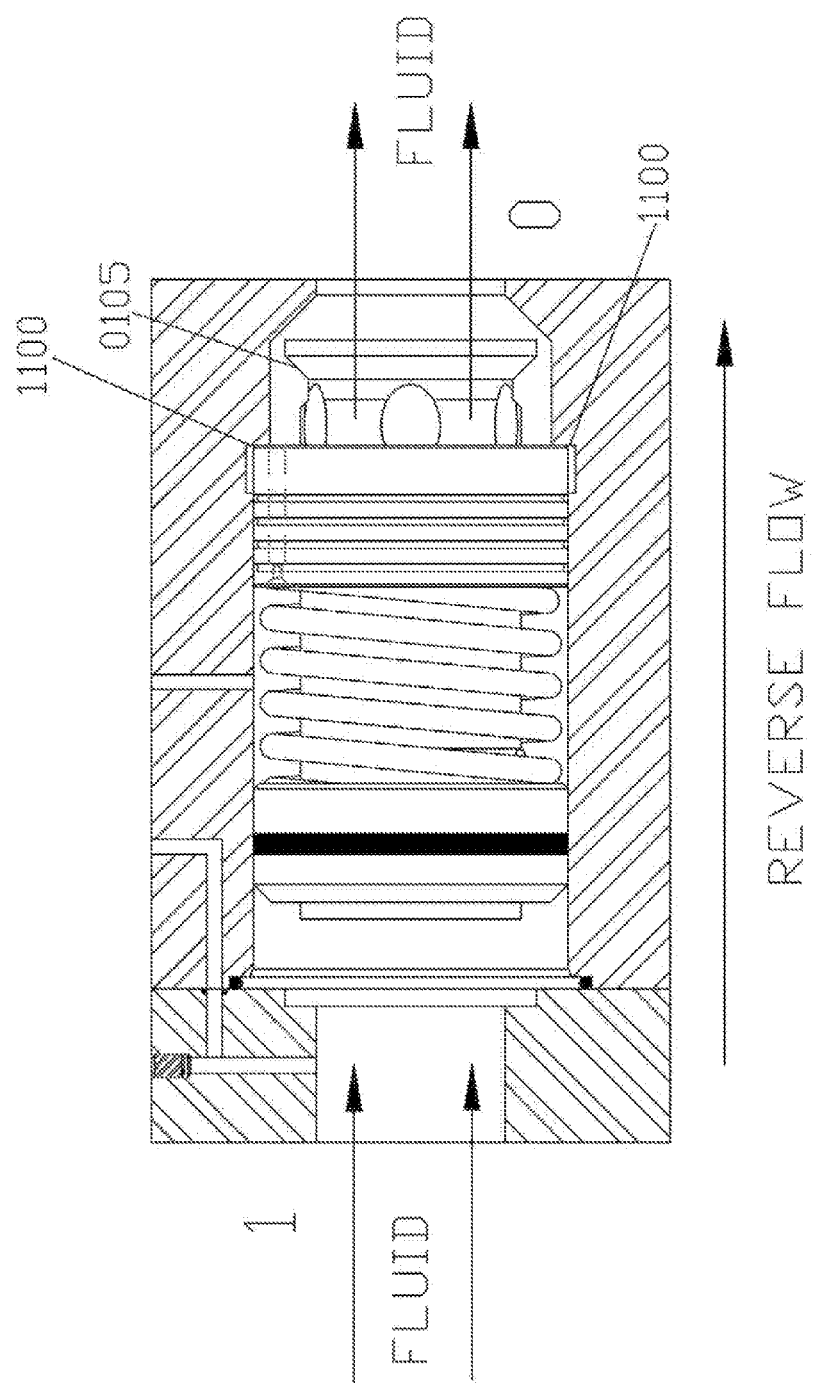
FIG. 16 shows a cross section of a slip-in valve assembly inside a body with reverse flow, according to an embodiment.

FIG. 16 shows a cross section of a slip-in valve assembly inside a body with reverse flow, according to an embodiment.

The slip-in valve assembly can also be configured for reverse flow (from left to right in FIG. 16) as well. This would operate as follows. Fluid would enter into the tubular poppet opening (the end opposite the control sleeve or from face 1). The central region would initially fill with the fluid but because it would not initially be able to exit out face 0 because the radial holes would initially be blocked by the control sleeve, particularly the metal-to-metal seal formed by the ID of the control sleeve against the poppet seat. The fluid would exert pressure on the inside diameter and left face of the tubular poppet and on retainer face 0209 which would push the entire tubular poppet towards face 0 (the poppet and retainer collar can move together as a unit). Note that the control sleeve might shift in position a little in the direction of face 0 (to the right in FIG. 16). A shoulder 1100 prevents the control sleeve from continuing to move towards face 0. As the fluid pressure forces the seat of the tubular poppet to move to the right (towards face 0 in the "reverse" direction), the retainer collar will also move along with the seat/tubular poppet towards face 0 (or to the right in FIG. 16). This compresses the spring as shown in FIG. 16. The radial holes (also referred to as hole set) in the tubular poppet are now exposed and even though it is the tubular poppet, not the control sleeve that has moved relative to the valve body, this is still considered the "open position" of the control sleeve.

Once the control sleeve is open, then the fluid inside the central region can exit the central region through the radial holes and out of the cartridge in a same (reverse) direction (from left to right in FIG. 16 or from face 1 to face 0). Thus, in this configuration, the fluid is able to flow in the reverse direction (the "forward" or "normal" direction being from face 0 to face 1 in FIG. 16).

Figure 17:
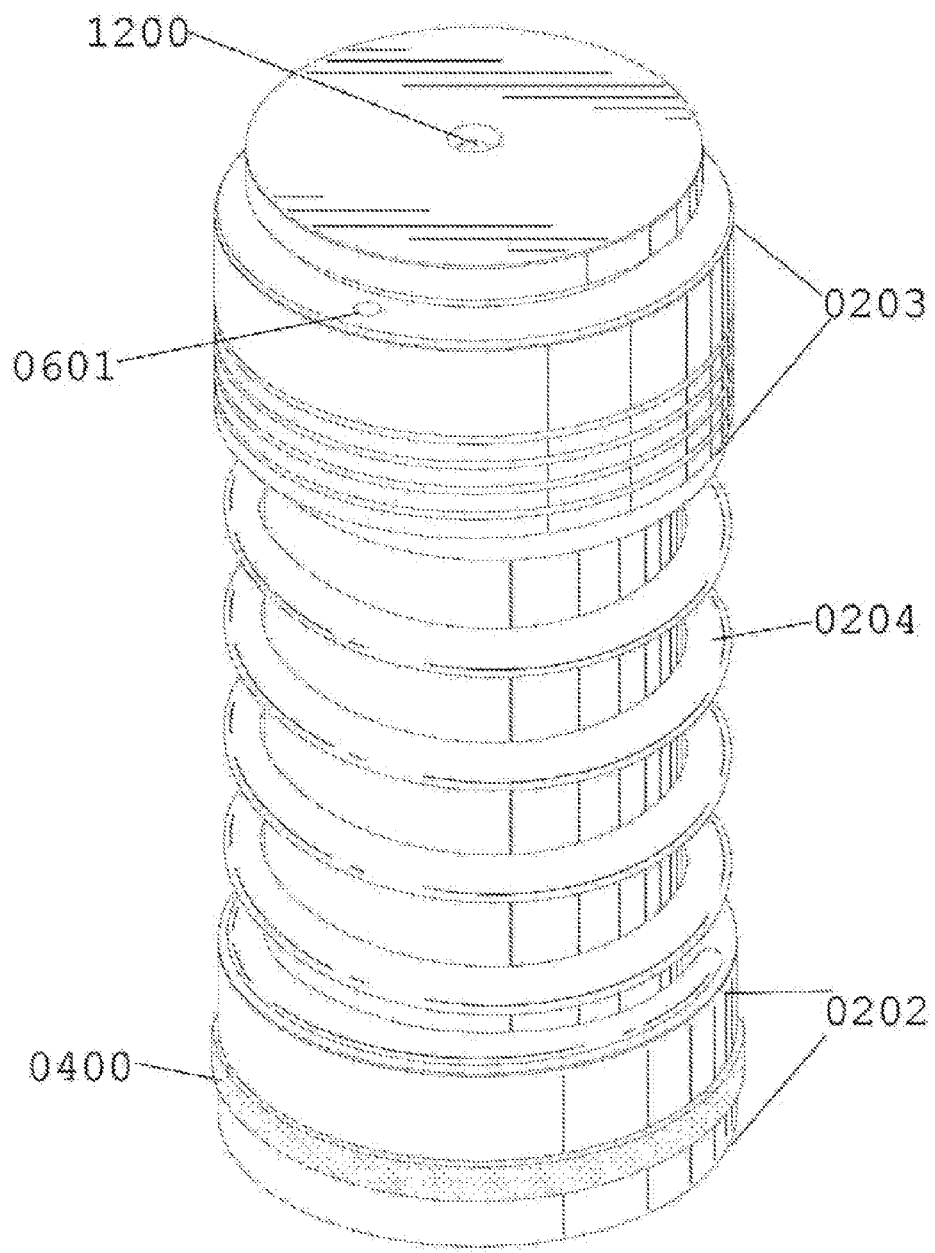
FIG. 17 is an orthographic view illustrating a front view of a slip-in valve assembly in a closed position, according to an embodiment.

FIG. 17 is an orthographic view illustrating a front view of a slip-in valve assembly in a closed position, according to an embodiment.

A notch 1200 is shown on an end of the valve assembly near the control sleeve 203. The notch 1200 is merely a slight recess with no ability for fluid or anything to pass through and serves no purpose other than allowing processing (grinding) operations of the poppet. Also shown are the aperture 0601, retainer collar 0202, and first poppet seal 0400.

Figure 18:
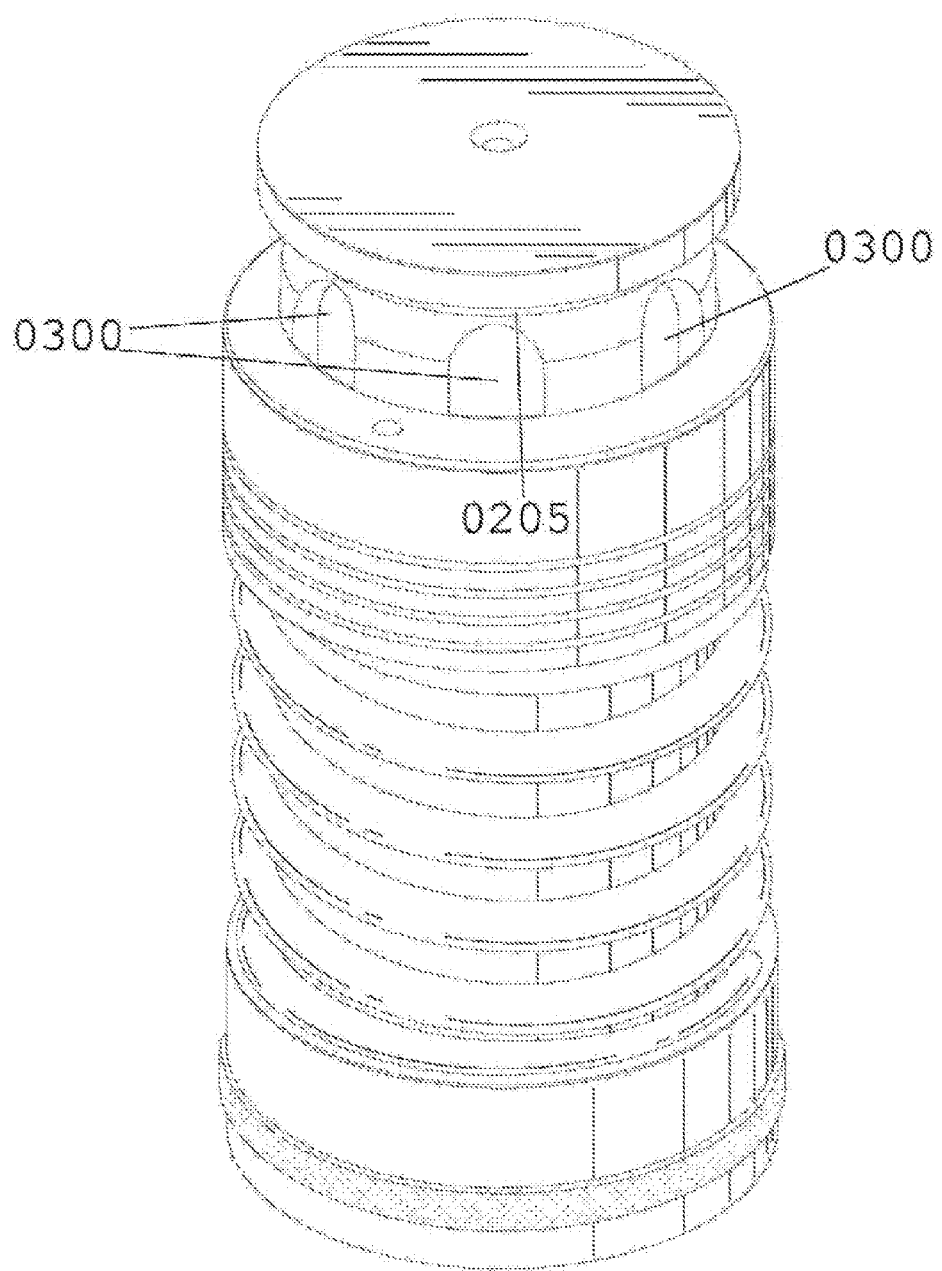
FIG. 18 is an orthographic view illustrating a front view of a slip-in valve assembly in assembly in open position, according to an embodiment.

FIG. 18 is an orthographic view illustrating a front view of a slip-in valve assembly in assembly in open position, according to an embodiment.

Radial holes 0300 (also referred to as a hole set) are exposed in the open position. Also shown is the seat 0205.

Figure 19:
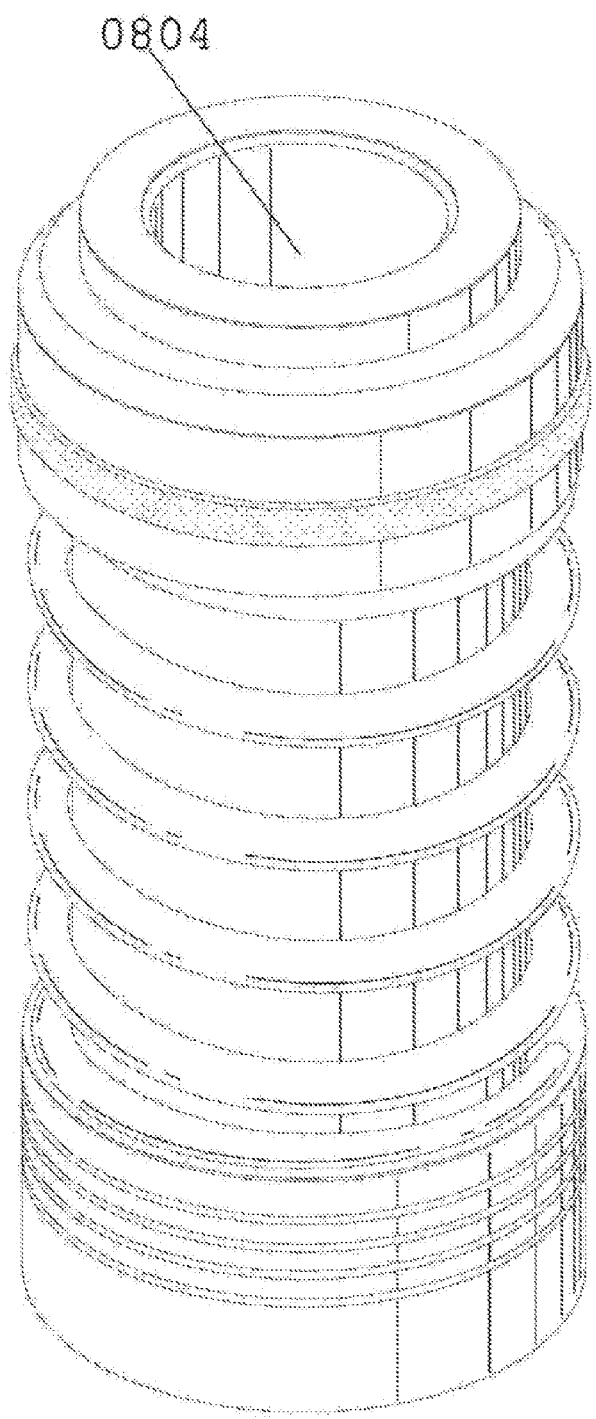
FIG. 19 is an orthographic view illustrating the tubular poppet opening of a slip-in valve assembly, according to an embodiment.

FIG. 19 is an orthographic view illustrating the tubular poppet opening of a slip-in valve assembly, according to an embodiment.

Tubular poppet opening 0804 is a hollow area which allows fluid to fill a central region inside the valve assembly.

Figure 20:
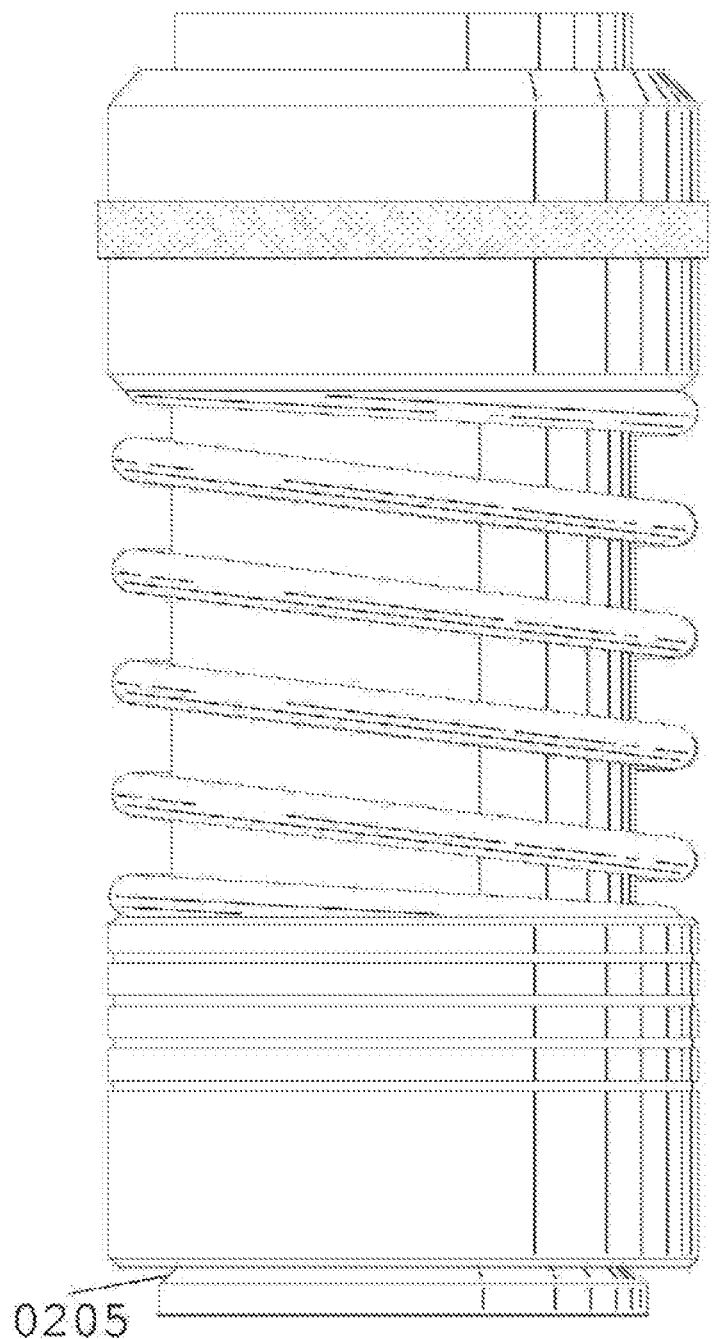
FIG. 20 is an orthographic side view illustrating a slip-in valve assembly, according to an embodiment.

FIG. 20 is an orthographic side view illustrating a slip-in valve assembly, according to an embodiment. The tapered end of the seat 0205 is shown. The seat can be shaped as a toroid with a rectangular trapezoidal cross section (as shown), and the control sleeve in the closed position abuts a tapered part of the region, thereby forming a fluid-tight (and air-tight) seal thereby preventing flow of fluid through/out the control sleeve. When the control sleeve is in the closed position, any fluid inside the central region would typically have no passage out of the valve assembly except through the tubular poppet opening 0804.

Figure 21A:
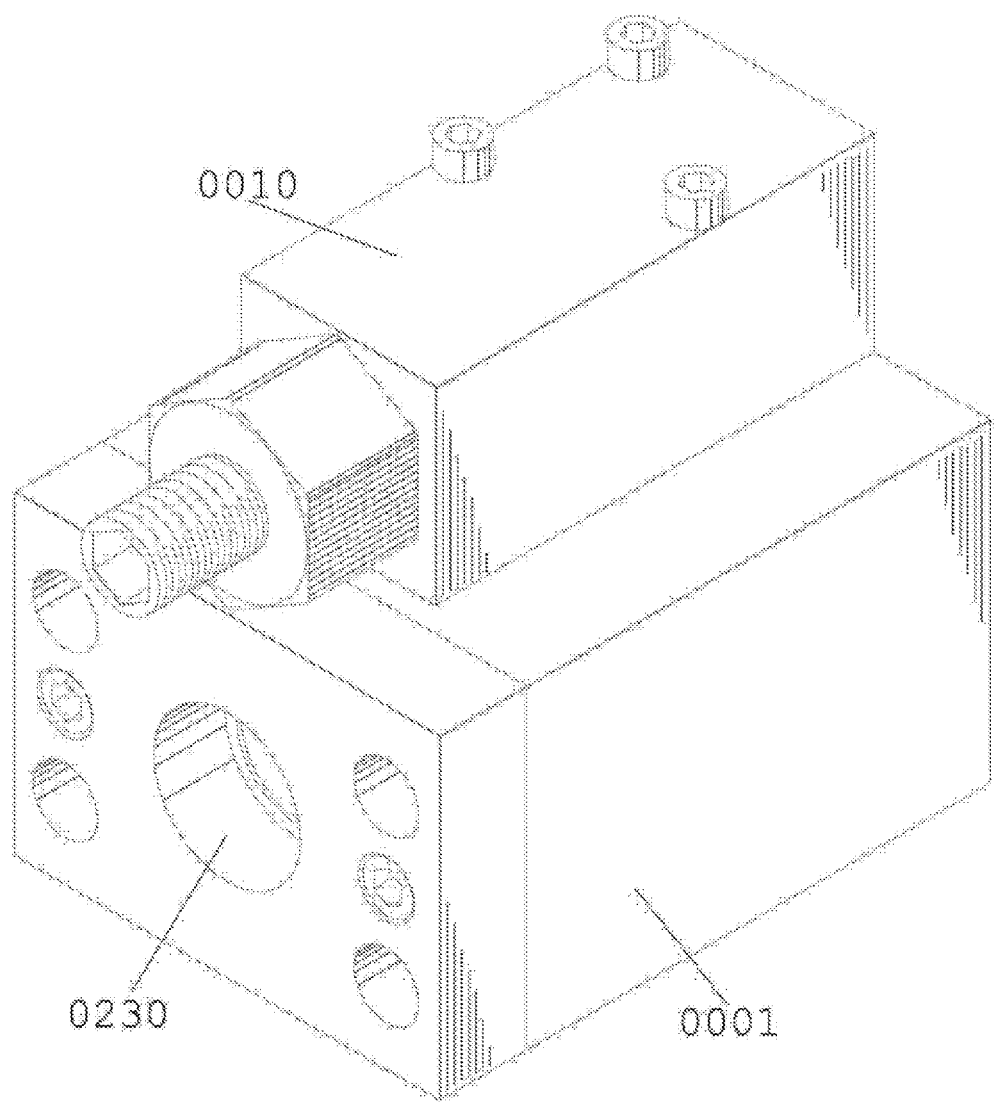
FIG. 21A is an orthographic view illustrating a front of a body and control module, according to an embodiment.

FIG. 21A is an orthographic view illustrating a front of a body and control module, according to an embodiment.

Body 0001 houses the valve assembly which is placed in the channel (also referred to as cavity) 230 in the body 0001. A control module 0010 as affixed to the body 0001 and can be configured as described herein to configure the valve assembly for different operations.

Figure 21B:
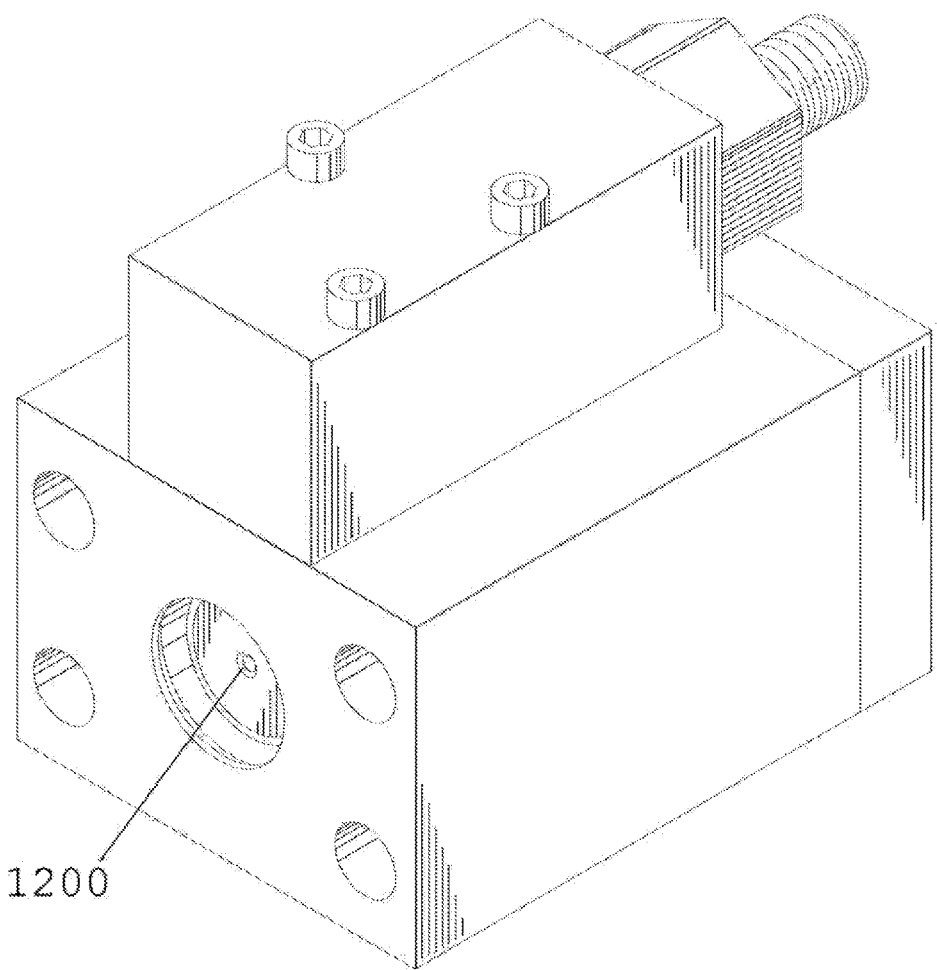
FIG. 21B is an orthographic view illustrating a back of a body and control module, according to an embodiment.

FIG. 21B is an orthographic view illustrating a back of a body and control module, according to an embodiment.

As known in the art, multiple bodies can be bolted together in an enclosed hydraulic circuit (which would also typically include a pump and a reservoir) which can be utilized in any manner (e.g., drive machinery, etc.)

Figure 22:
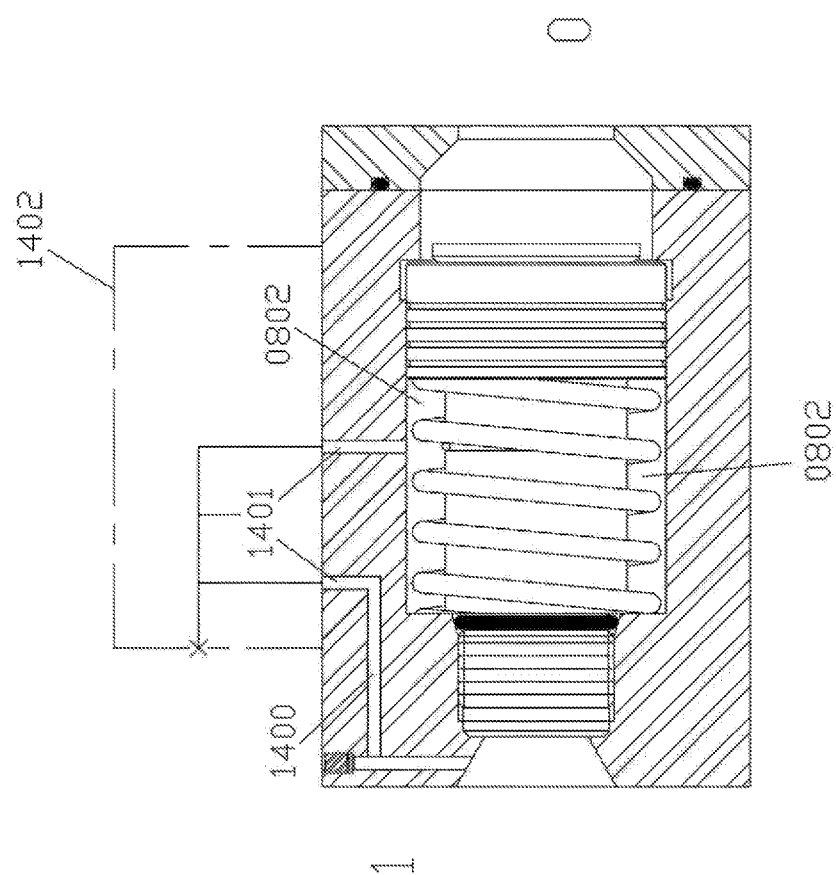
FIG. 22 is a cross section showing a thread-in assembly installed within a valve body, according to an embodiment.

FIG. 22 is a cross section showing a thread-in assembly installed within a valve body, according to an embodiment. The control chamber 0802 stores fluid in between the outer diameter of the tubular poppet and the diameter of the channel in the body 1400 which houses the valve assembly. If there is no passage in the control sleeve (as illustrated in FIG. 22) then the control chamber 802 should typically be initially empty since there would be no way for fluid to enter/exit the control chamber 802 in this example (except for the potential for leakage around a small annular clearance around the outer diameter of the control sleeve as discussed above).

The assembly in FIG. 22 can allow fluid flow from face 0 to face 1 but not from face 1 to face 0. Flow from face 1 to face 0 would not urge the spring to open the control sleeve, while flow from face 0 to face 1 would put pressure on the forward face and thus urge the control sleeve open breaking the seal between the control sleeve and the seat of the poppet thereby allowing fluid to flow from outside the poppet through the hole set and hence through the poppet. Note that if fluid attempts to flow from face 1 to face 0 the fluid would pass up the drain path 1401 in the control module 1402) and into the control chamber 0802 which would provide more force to urge the control sleeve closed (to the right in FIG. 22).

Figure 23:
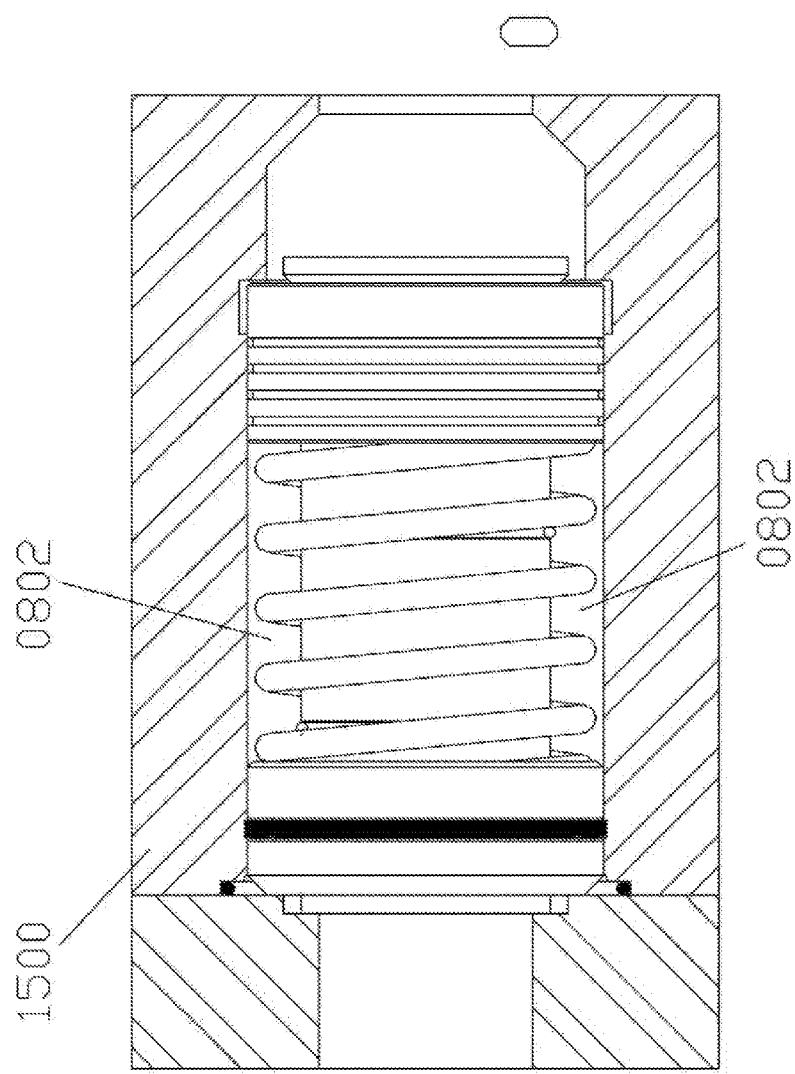
FIG. 23 is a cross section showing the alternate slip in assembly (with the retainer collar) installed within a valve body, according to an embodiment.

FIG. 23 is a cross section showing the alternate slip in assembly (with the retainer collar) installed within a valve body, according to an embodiment.

The control chamber 0802 stores fluid in between the outer diameter of the tubular poppet and the diameter of the channel in the body 1500 which houses the valve assembly. If there is no passage 0606 in the control sleeve (as shown in FIG. 23) and seals are used on the control sleeve (no seals are used on the control sleeve in FIG. 23) then the control chamber 802 should typically be empty since there would be no way for fluid to enter/exit the control chamber 802 in this example. If there is no passage in the control sleeve and seals are not used on the control sleeve (as illustrated in FIG. 23) then the control chamber 802 may eventually fill due to the slight leakage path between the outer diameter of the control sleeve and the inner diameter of the valve body bore). In order for the valve to operate as shown in FIG. 23, any air or fluid in the control chamber would need to be compressed in order to allow the control sleeve to open, unless the air or fluid is somehow allowed to exit the chamber. The only way this may happen as shown in FIG. 23 is for the air or fluid to follow the leakage path around the outer diameter of the control sleeve. In the other embodiments shown with a drain, once the valve has been opened to flow, and then closes, the chamber will then at least partially fill with fluid. The action of the control sleeve closing will result in the control chamber drawing a partial vacuum. Fluid will be drawn into the control chamber from the region of face 1 through the drain. The chamber may initially be empty, but will at least partially fill after the first cycle. The embodiment shown in FIG. 23 is not, from a practical perspective, an ideal embodiment.

The slip in assembly illustrated in FIG. 23 can also be used with the control module configured as illustrated in FIG. 22 (with the drain path as illustrated).

Figure 24:
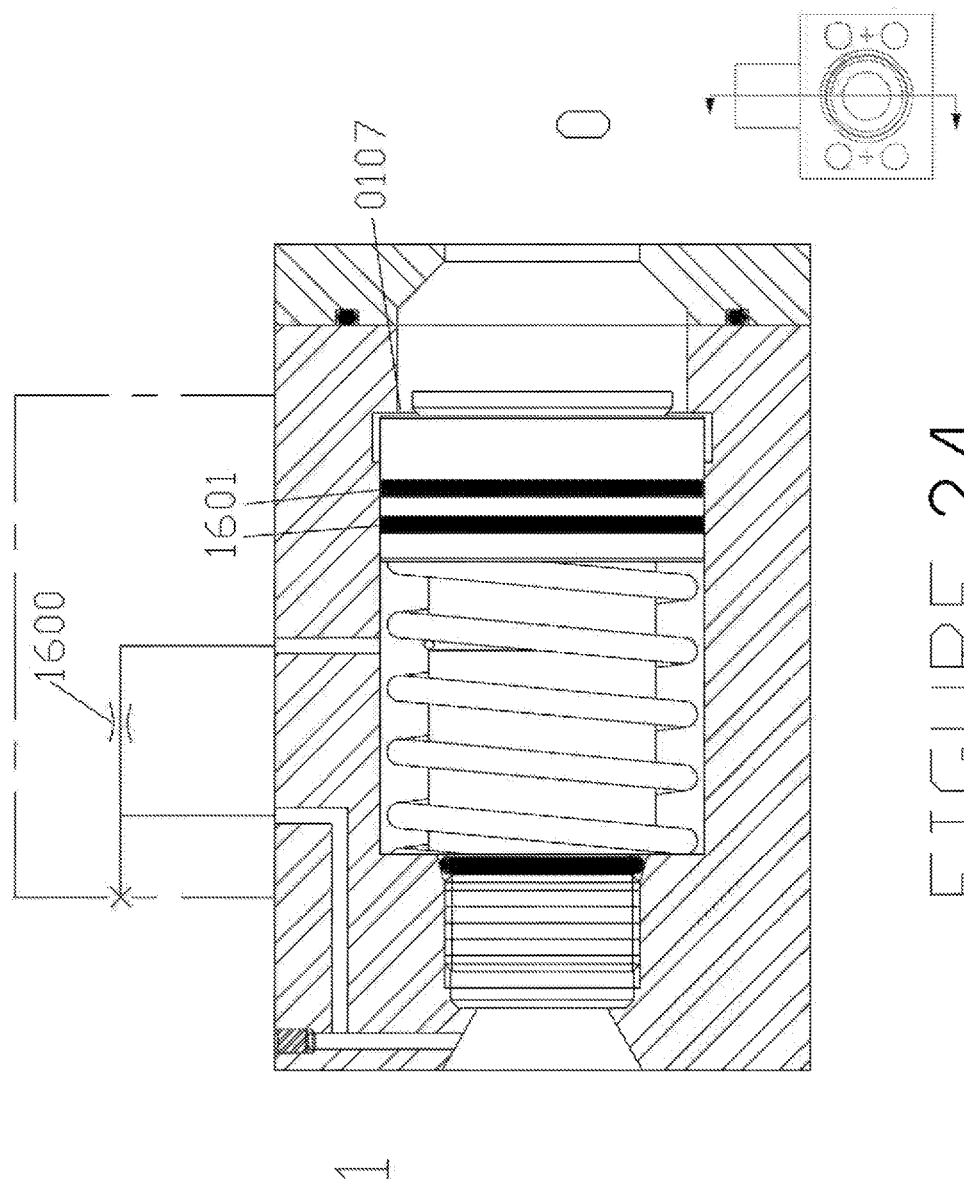
FIG. 24 is a cross section illustration an example of a check valve configuration with control sleeve seals, according to an embodiment.

FIG. 24 is a cross section illustration an example of a check valve configuration according to an embodiment. This is a simple embodiment of the inventive concept. No pilot or passage in the control sleeve is used in this embodiment. Note that the cross section illustrated is shown in the legend in FIG. 24 (in fact all cross sections illustrated herein can be based on the same legend). FIG. 24 illustrates a closed valve (closed control sleeve). Flow is allowed from face 0 to face 1 but prevented from face 1 to face 0.

Figure 25:
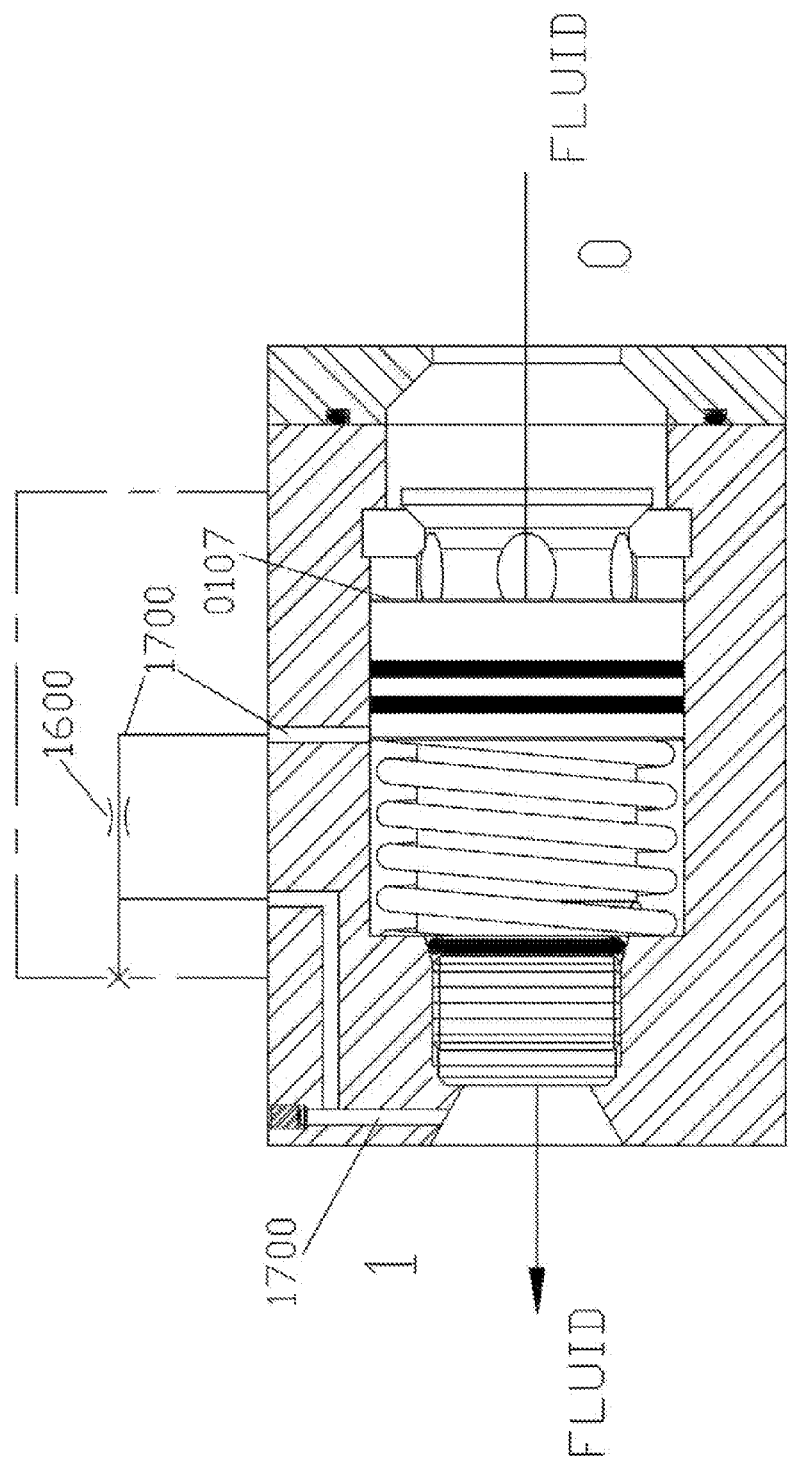
FIG. 25 is a cross section illustration of the check valve configuration with control sleeve seals in an open position, according to an embodiment.
Figure 26:
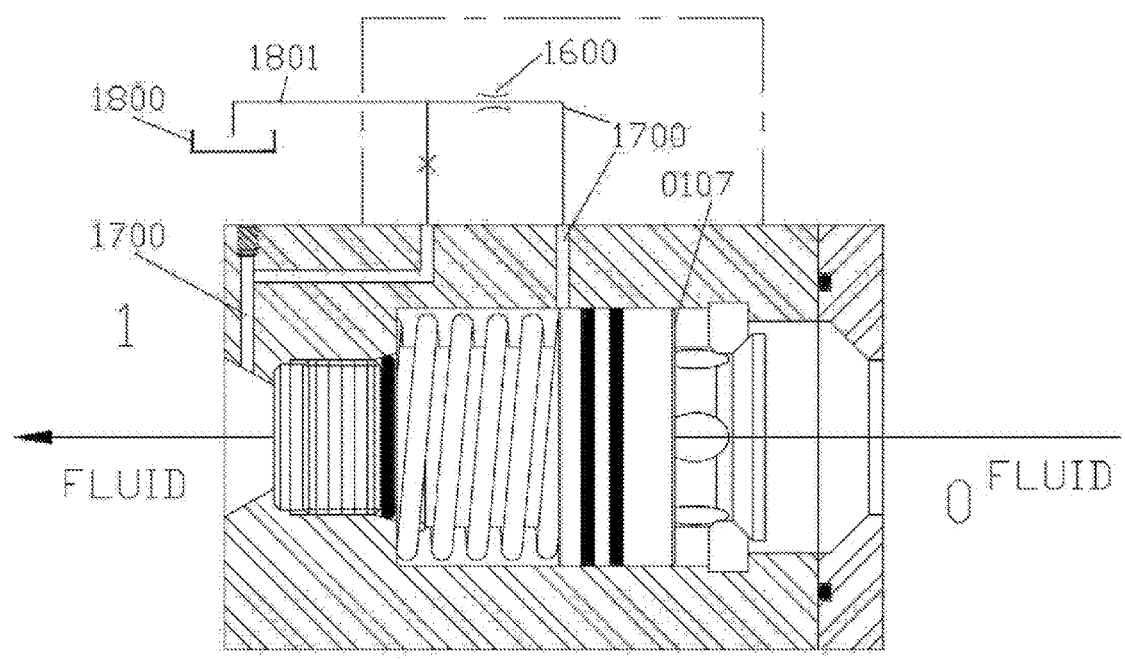
FIG. 26 is a cross section illustration of the check valve configuration with control sleeve seals with an external drain, according to an embodiment.

FIG. 24 is similar to the configuration in FIG. 22, but note that in FIG. 24, the control sleeve has two control sleeve seals 1601 (although other numbers of control sleeve seals can be used from 1 to 4). Not using control sleeve seals 1601 may be adequate at lower system pressures, but it may not be ideal for use with higher system pressures due to the leakage around the control sleeve. Control sleeve seals 1601 are located around the outer diameter of the control sleeve to eliminate any flow from the control cavity outward to face 0 (and vice versa). This can occur because there is a slight clearance between the outer diameter of the control sleeve and the inner diameter of the bore used to house the assembly in order to provide room for the control sleeve to slide. The control sleeve seals 1601 can be made of any sealing material (e.g., rubber, silicone, etc.) and prevent fluid from passing through the clearance between the control sleeve and the bore of the body. Thus, in FIG. 24, by virtue of the control sleeve seals 1601, the control chamber 0802 should be empty unless there is any reverse flow. FIGS. 25 and 26 also illustrate control sleeve seals on the control collar.

Note that in any embodiment described or illustrated herein, control sleeve seals 1601 (and in fact any of the seals described herein such as the first poppet seal 400, second poppet seal 820, the retainer collar seal 0707) may or may not be used at the user's option. For example, any embodiment described or illustrated herein that uses control sleeve seals (or other type of seal) can also be implemented without control sleeve seals. Any embodiment described or illustrated herein that does not use control sleeve seal(s) (or other type of seal) can also be implemented using one or more control sleeve seal. Any seals described herein can also be used in any combination. For some embodiments of the invention, particularly where the control sleeve is provided with a passage 0606, and the valve response time must be relatively fast to modulate pressure, the control sleeve seals shown in FIG. 24 may not be advantageous due to issues of stiction, longer response time, and possible premature seal wear.

In a further embodiment, a control module orifice 1600 may be added to the control module to slow the response time of the valve opening and closing. This may be advantageous in certain applications, particularly where valve chatter is a problem. The control module orifice 1600 is entirely optional and may or may not be used in any embodiment described or depicted herein as per the user's preferences.

In this embodiment, the poppet is threaded into the flanged body. Pressure coming from the side opposite the threaded end (the right side in FIG. 24) acts on the forward face 0107 of the control sleeve, which urges the control sleeve open. This is opposed by the spring force acting in the opposite direction. The control sleeve opens when the force urging the control sleeve open (pressure on the forward face 0107 multiplied by the area of the forward face 107) is greater than the spring force. This is the valve cracking pressure. Selecting various spring attributes such as K factor and spring compression in the closed state may vary the cracking pressure. FIG. 25 is an illustration of this embodiment after the control sleeve opens.

FIG. 25 is a cross section illustration of the check valve configuration in an open position, according to an embodiment.

After the pressure urges the control sleeve open from FIG. 24, the control sleeve will be open as illustrated in FIG. 25. The fluid can now flow from the control sleeve side to the threaded side (from right to left in FIG. 25). The fluid comes from the right side, enters the radial holes (which were blocked in FIG. 24 when the control sleeve is in the closed position), travels through the central region inside the poppet and out through the threaded end. When the pressure on the forward face is not great enough to continue to maintain the control sleeve in the open position (e.g., the spring force becomes greater than the force on the control sleeve (pressure on the forward face 0107 multiplied by the area of the forward face 107), then the spring will force the control sleeve back into the closed position again and stop further fluid flow through the poppet.

Reverse flow is prevented. The spring naturally urges the control sleeve closed, and thus fluid entering through the threaded end would not escape through the radial holes since the control sleeve would be closed. Reverse flow fluid could also enter the drain 1700 and into the control chamber, further serving to urge the control sleeve in the closed position.

Thus, when pressure on the line is greater than a particular amount, the valve will open and thus provide pressure relief to the line. If the K factor of the spring is small enough to allow easy opening of the control sleeve, then this valve assembly would operate as a simple check valve permitting flow in only one direction. Note that the control chamber would typically be empty in this embodiment, unless there is reverse flow from the threaded end which would fill the control chamber via drain 1700 but the fluid would not pass through the control sleeve (and hence would not exit the check valve except for a small amount of leakage through the annular clearance around the outer diameter of the control sleeve) but would provide additional resistance to the control sleeve opening. When there is forward flow, the forward flow would open the control sleeve and release some of the fluid in the control chamber through the drain 1700. This embodiment could also function as a direct operating relief valve or direct operating sequence valve, by selecting a spring appropriate for the application.

In the simplest embodiment, the control module merely serves to vent the control chamber to allow movement of the control sleeve. Note that the control module may be either internally drained such as internal drain 1700, or externally drained (the drainage path would be independent of the discharge flow path of the valve as in FIG. 26).

FIG. 26 is a cross section illustration of the check valve configuration with an external drain, according to an embodiment.

Backpressure on the valve may affect the valve cracking pressure. Backpressure on the valve will affect the fluid pressure in the control chamber. This will tend to assist the spring force in urging the control sleeve closed (control chamber pressure multiplied by control sleeve area 2). In those circumstances where this is not desirable, then external drainage of the control module is preferred using an external drain 1801 which leads to a fluid reservoir 1800.

Reverse flow through the valve (flow from face 1 to face 0) is prevented by the seat at the control sleeve/poppet interface. Flow from face 1 to face 0 would be induced by a pressure gradient higher at face 1, and lower at face 0. The net forces on the control sleeve in this instance will urge the control sleeve closed and prevent flow from face 1 to face 0).

As the sleeve is guided over the poppet, this design has advantages over unguided disc or ball type check valves in applications where turbulence induced premature wear may be a concern.

The control module can be changed to affect the operation of the valve. For example, instead of a simple direct operating check valve as noted above, the control module may be enhanced to make the valve a pilot to open a check valve.

Figure 27:
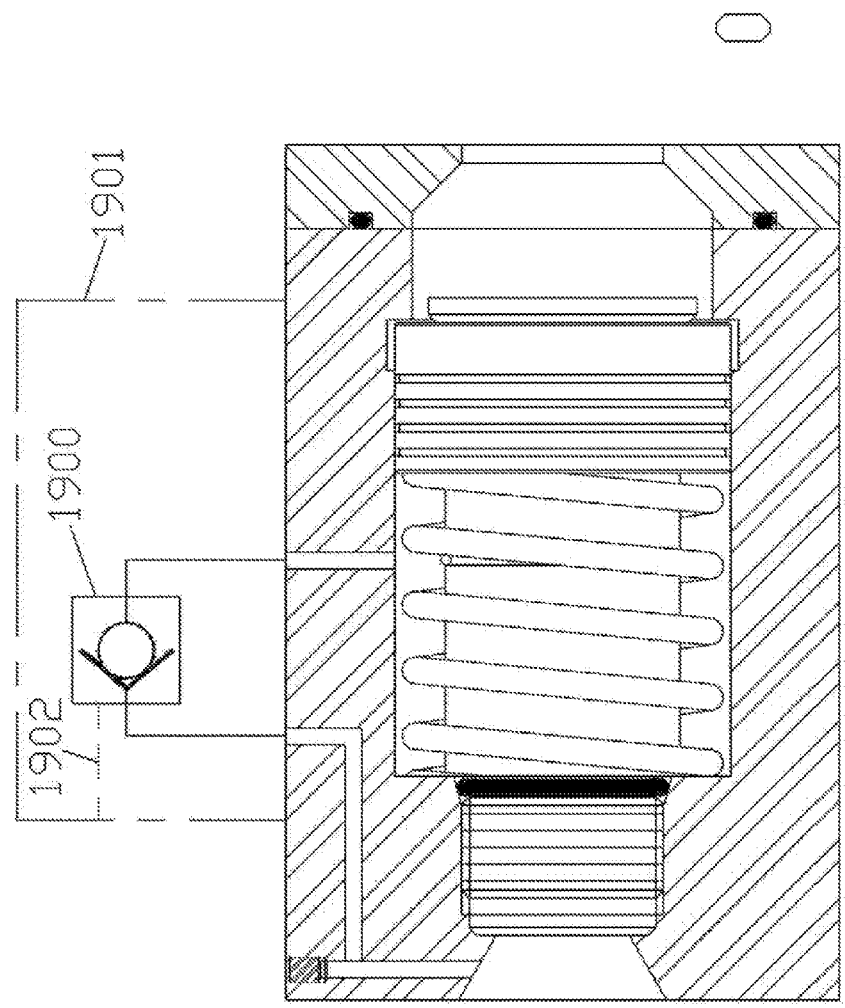
FIG. 27 is a cross section illustration of a valve assembly with an external pilot signal, according to an embodiment.

FIG. 27 is a cross section illustration of a valve assembly with an external pilot signal, according to an embodiment.

In this example, a normally closed pilot valve 1900 is in a control module 1901 and replaces the simple drain in the control module as described above. This pilot valve 1900 allows flow from the threaded end to the control chamber, but prevents flow from the control chamber to the drain unless the pilot valve 1900 is acted upon by a pilot signal. In this example, an external pilot signal 1902 is used to open the pilot valve 1900, and permit the control chamber to drain. The control sleeve may then open providing that the inlet pressure at face 0 acting on the forward face of the control sleeve exceeds the spring force. If the control chamber is full of fluid, then the valve would not allow flow in either direction until the signal is received to open the pilot valve 1900 in which flow is then enabled from face 0 to face 1.

Any pilot valve used and the main valve (the valve assembly that enables or disables flow from face 0 to face 1 via opening/closing the control sleeve) interact in a master-slave relationship. Thus, the pilot valve can be altered to result in any number of functions for the main valve element.

Figure 28:
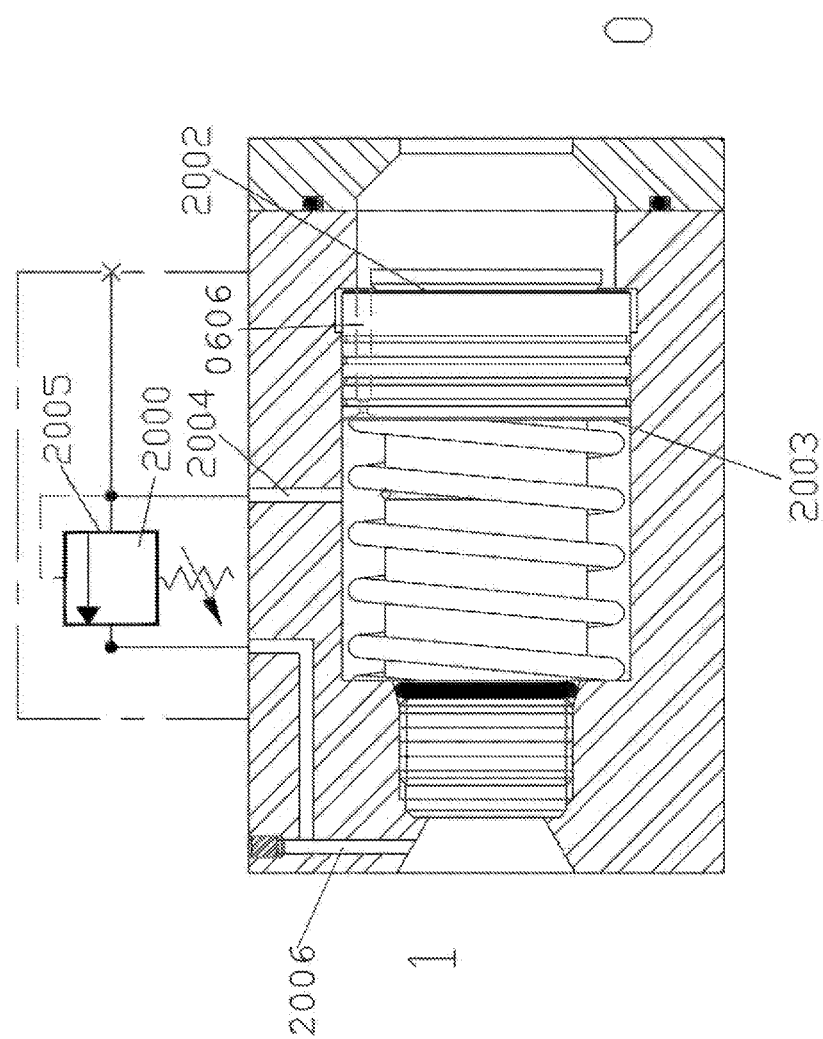
FIG. 28 is a cross section illustration of a valve assembly with an internal pilot signal, according to an embodiment.

FIG. 28 is a cross section illustration of a valve assembly with an internal pilot signal, according to an embodiment. This configuration can be used as a pressure relief valve.

This is the same valve assembly (main valve) from FIG. 27 but controlled with a direct operating pilot relief valve 2000 (which opens only when its incoming pressure is greater than a preset pressure otherwise it remains closed) in the control module. In this example, the control sleeve is provided with a communication between the fluid entering from face 0 and the control chamber (e.g., from the forward face 2002 to the control face 2003), which is passage 0606 (which can comprise an aperture, orifice, and conical area) which provides a controlled leakage between the upstream control face and the control chamber. In some embodiments, this can enable piloted versions of the valve assembly to operate based on a pressure in the control chamber.

Pressurized fluid coming from face 0 onto the forward face 2002 will urge the control sleeve to open as described above. Due to the flow of fluid through the passage 0606 across the control sleeve, pressurized fluid will fill the control chamber. This will act on the control face 2003, tending to urge it closed. The spring force will also tend to urge the control sleeve closed. Thus, absent another exit path for the fluid from the control chamber, the control sleeve will typically remain closed regardless of how much pressure is exerted on the control face from face 0 (coming from right to left).

Fluid is prevented from exiting the control chamber due to the direct acting pilot relief valve 2000 in the control module, which is blocking the path from the control chamber to the drain. Fluid can travel up pilot path 2004 and stops at relief face 2005 of the relief valve 2000.

When the pressure at relief face 2005 of the pilot relief valve 2000, and thus the pressure in the control chamber, exceeds the setting of the pilot relief valve 2000, the pilot relief valve 2000 will open, allowing the fluid in the control chamber to drain (through the pilot relief valve 2000 and into the drain exit 2006). As there is an orifice in the passage 0606 in the control sleeve, fluid is drained from the control chamber faster than it can be replenished. The hydraulic forces on the control sleeve will become unbalanced and tend to urge the control sleeve open. The valve will open when the net hydraulic force on the control sleeve exceeds the spring force. The control sleeve will attempt to maintain a steady state position such that the pressure drop across the control sleeve, resulting in a net hydraulic force on the control sleeve, balances the spring force on the control sleeve.

This type of valve is said to be internally piloted. The pilot relieve valve 2000 receives its pilot signal from the same source as the main pressure source acting upstream on the valve.

Figure 29:
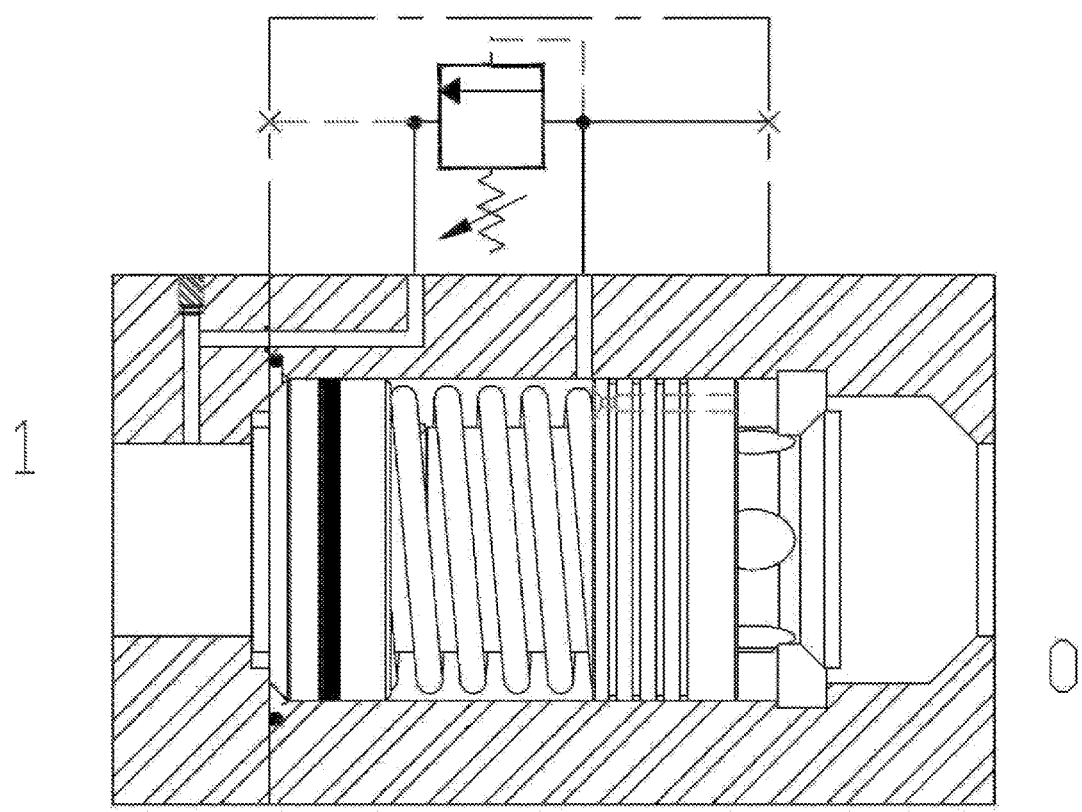
FIG. 29 is a cross section illustrating an internally piloted, internally drained relief valve with the reverse flow option, according to an embodiment.

FIG. 29 is a cross section illustrating an internally piloted, internally drained relief valve with the reverse flow option, according to an embodiment.

The valve assembly shown in FIG. 29 is similar to the valve assembly shown in FIG. 28 but for instead of the threaded end, the retainer collar is used (as described herein). This would accommodate reverse flow, as described herein.

Figure 30:
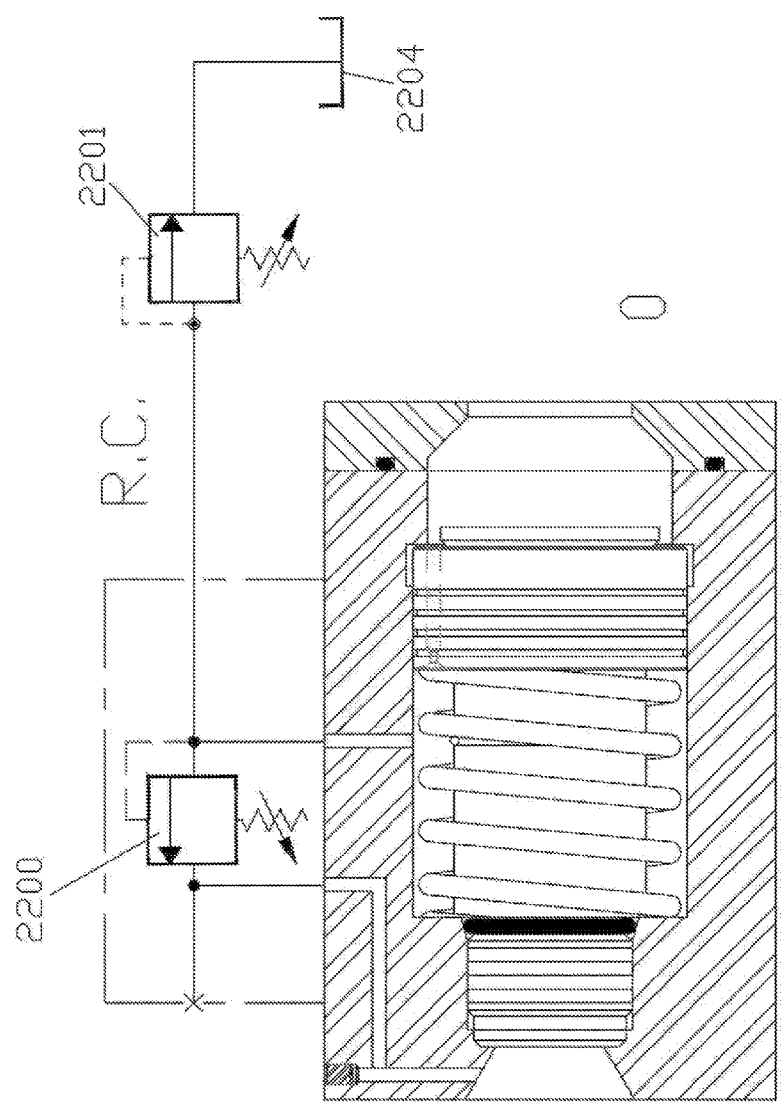
FIG. 30 is a cross section illustration of a valve assembly with a remote control, according to an embodiment.

FIG. 30 is a cross section illustration of a valve assembly with a remote control, according to an embodiment In this example, the remote control 2201 is connected to a fluid tank 2204 and can adjust the pressure setting below the maximum pressure setting of the pilot valve 2200 in the control module. This configuration can also be used with the retainer collar embodiment as well.

In an embodiment, a remote control can be used where the state of the remote control (set by an operator) is infinitely variable between fully open and fully closed, rather than having discrete positions. This type of valve can be controlled with a proportional electrical signal or the like. Thus, the pilot valve controlled by the remote control is not limited to discrete open and closed position but also is capable of having continuous degrees of open/close based on the signal. Thus the rate of flow through the pilot valve can be controlled by the remote control (in addition to just on/off).

Figure 31:
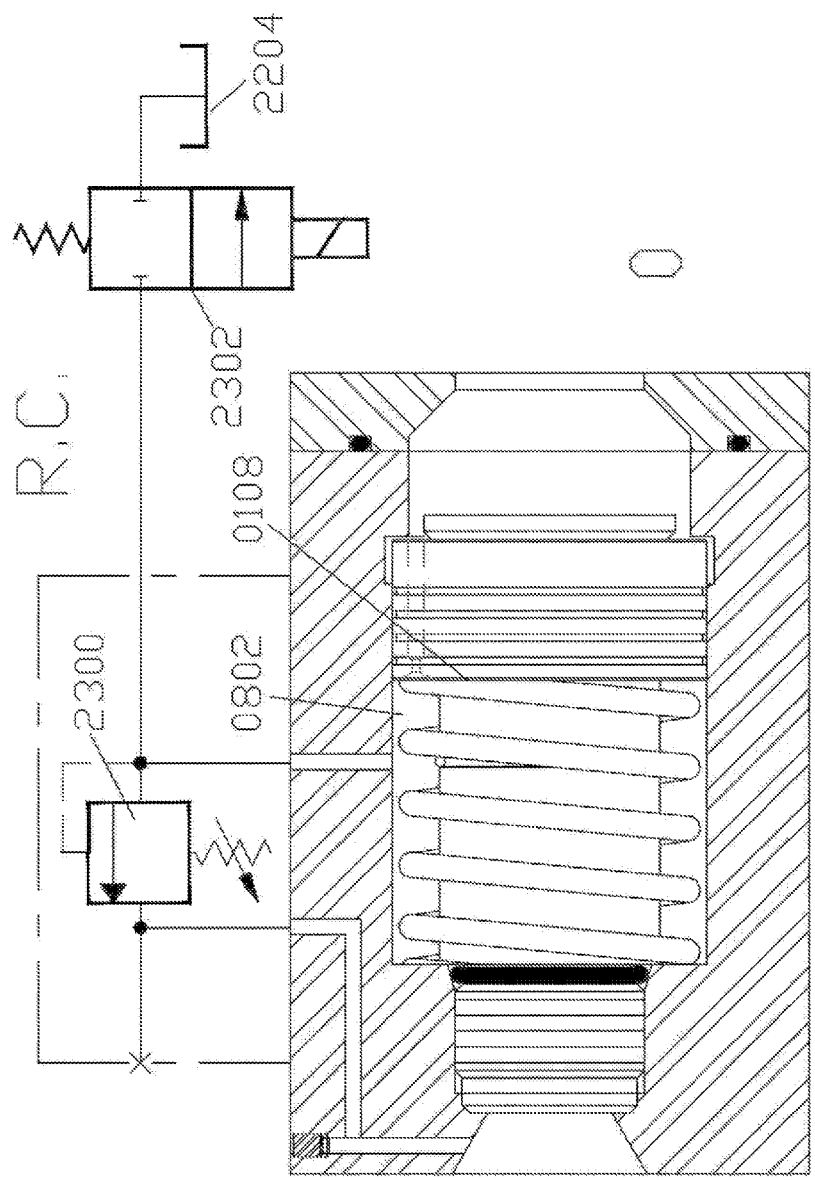
FIG. 31 is a cross section illustration of a valve assembly with a remote control connected to a 2-position, 2-way valve configured as a vented relief valve, according to an embodiment.

FIG. 31 is a cross section illustration of a valve assembly with an external pilot 2300 connected to a 2-position, 2-way valve 2302 configured as a vented relief valve with a fluid tank 2204, according to an embodiment.

When the 2-way valve 2302 is closed (as shown) the pilot valve 2300 behaves as an internally piloted valve (will open automatically when the pressure inside the control chamber 0802 reaches a certain level). When a signal is sent to the solenoid of the 2-way valve 2302 causing it to shift (the second control envelop with an arrow), the control chamber is vented to the tank 2204 at very low pressure, removing the hydraulic resistance on the control face of the control sleeve, and allowing it to shift.

This configuration can also be used with the retainer collar embodiment as well.

Different valve elements in the control module can make the main valve behave in a number of ways. For example, the main valve can be made to perform as a counterbalance valve, pressure reducing valve, sequence valve, unloading valve, etc. The valve and body may be configured in other ways to provide still more functions.

Figure 32:
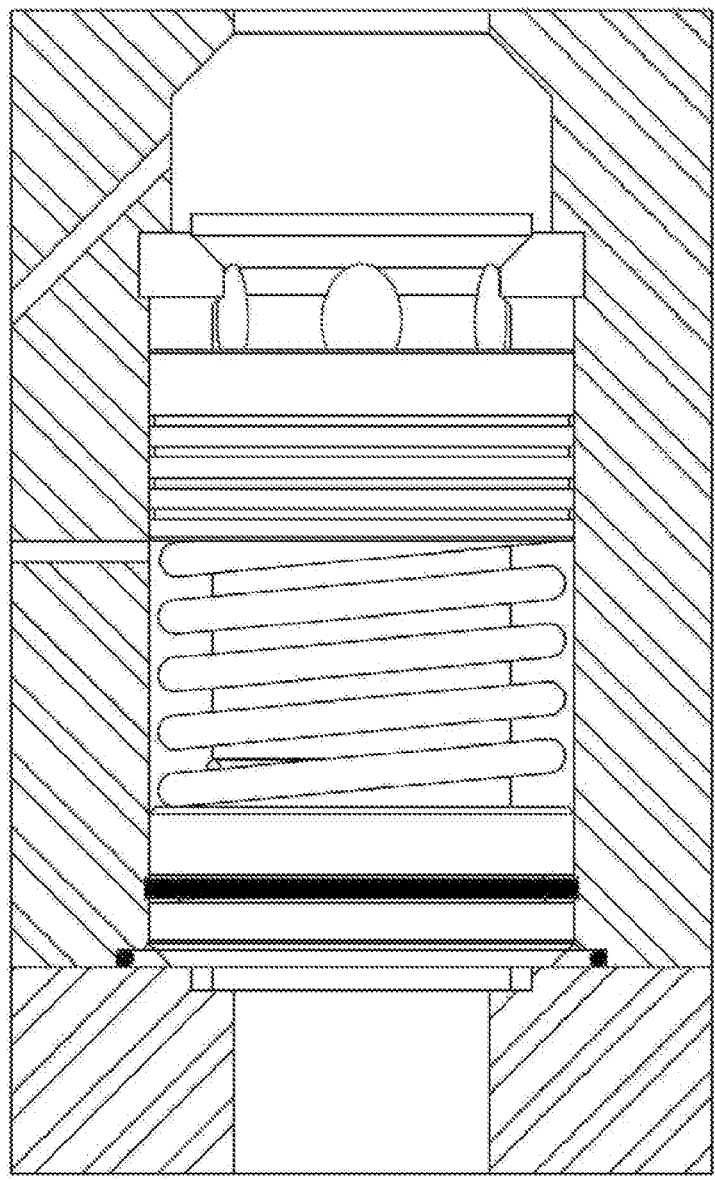
FIG. 32 is a cross section illustration illustrating a slip-in insert and valve body configured to provide flow control function, according to an embodiment.

FIG. 32 is a cross section illustration illustrating a slip-in insert and valve body configured to provide flow control function, according to an embodiment.

In this embodiment, the passage in the control sleeve is replaced with a poppet orifice (not shown in FIG. 32 but see FIG. 33) in the body of the tubular poppet. By selecting a pilot valve in the control module to maintain a constant pressure drop across the orifice in the poppet, the main valve can be made to provide a constant rate of flow.

Figure 33:
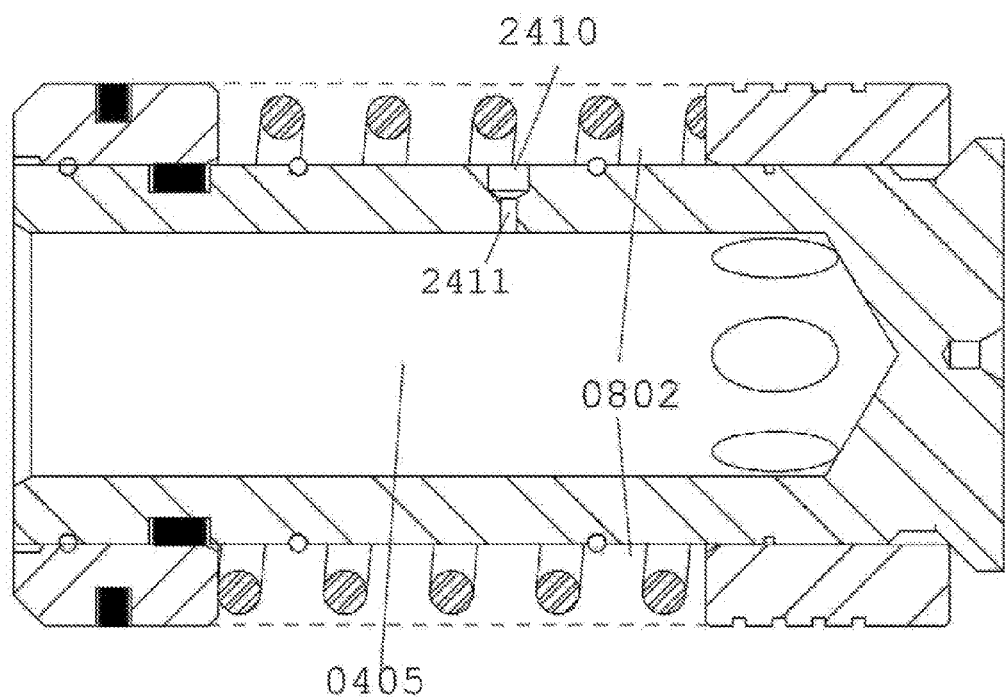
FIG. 33 is a cross section illustration of a slip in assembly including a tubular poppet configured to provide flow control function, according to an embodiment.

FIG. 33 is a cross section illustration of a valve assembly with a tubular poppet configured to provide flow control function, according to an embodiment.

A poppet aperture 2411 is in communication with a poppet orifice and opening 2410 permitting flow between the central region 0405 inside the tubular poppet and the control chamber 0802. FIG. 33 is illustrated as a cross section and note that this poppet aperture 2411 and poppet orifice 2410 and opening do not exist as a ring (for example like the seals) but exists only as a small passage/opening.

Unlike the passage 0606 in the control sleeve 0103, the poppet aperture 2411 and poppet orifice 2410 permit flow directly between the central region 0405 and the control chamber 0802. Since the control chamber 0802 can be piloted (using an internal, external, or any other type of pilot) this enables additional functionality to be used for flow control.

FIG. 22 shows a thread-in assembly installed within a valve body, preventing the flow of fluid from face 1 to face 0. This embodiment requires a threaded end on the poppet an also a reciprocating threaded attachment on the valve body. In a further embodiment, flow of fluid can be prevented from face 1 to face 0 by using a stepped retainer collar which fits into a body which has a recess to accommodate the stepped retainer collar, thereby preventing movement of the retainer collar in the direction towards the control sleeve (the direction of face 0).

Figure 34A:
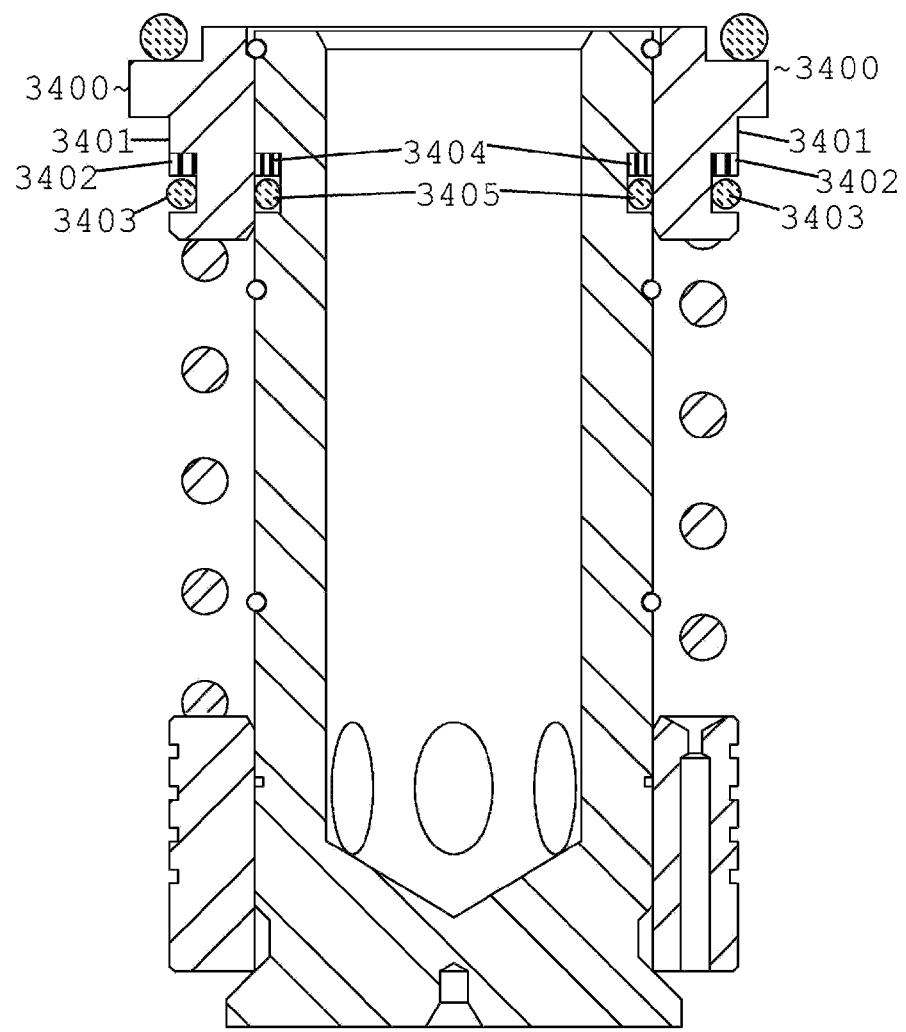
FIG. 34A shows a cross section of the tubular poppet with a stepped retainer collar, control sleeve, and spring, according to an embodiment.

FIG. 34A shows a cross section of the tubular poppet with a stepped retainer collar, control sleeve, and spring, according to an embodiment.

Note that the retainer collar has a retainer collar outer face 3401 and a step 3400 with increased diameter. This step 3400, when the assembly is inserted into a flange body (illustrated in FIGS. 35-37) would prevent the retainer collar from moving towards the control sleeve. This would prevent the retainer collar from engaging the second retaining ring, thereby urging the poppet off of its seat and allowing flow of fluid in the direction from face 1 (near the retainer collar) to face 0 (in the direction of the control sleeve).

There is a recess in the retainer collar which accommodates an outer O-ring 3403 and an O-ring back up ring 3402.

The O-ring back up ring 3402 helps plug up any diametrical clearance and prevents extrusion of the outer O-ring 3403. The outer O-ring 3403 and the O-ring back up ring 3402 help prevent leakage between the outer diameter of the retainer collar and the flange body. There is also an inner O-ring 3405 and an inner back up O-ring 3404 which are located in a recess in the poppet. The inner O-ring 3405 and the inner back up O-ring 3404 are used to prevent leakage between the control chamber and the inner diameter of the retainer collar. As discussed herein, the control chamber will contain pressurized fluid and so both pairs of O-rings 3402, 3403, 3404, 3405 serve to prevent leakage from the control chamber through either side of the retainer collar.

Figure 34B:
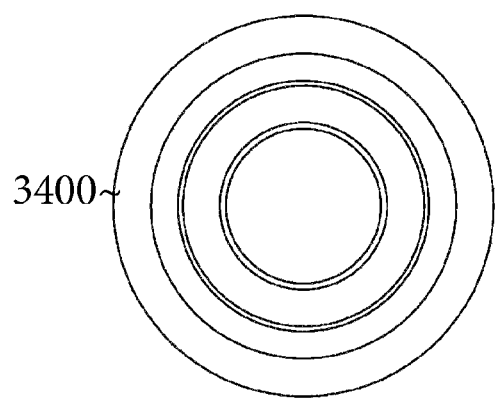
FIG. 34B shows a front view of a valve assembly that has a stepped retainer collar, according to an embodiment.
Figure 34C:
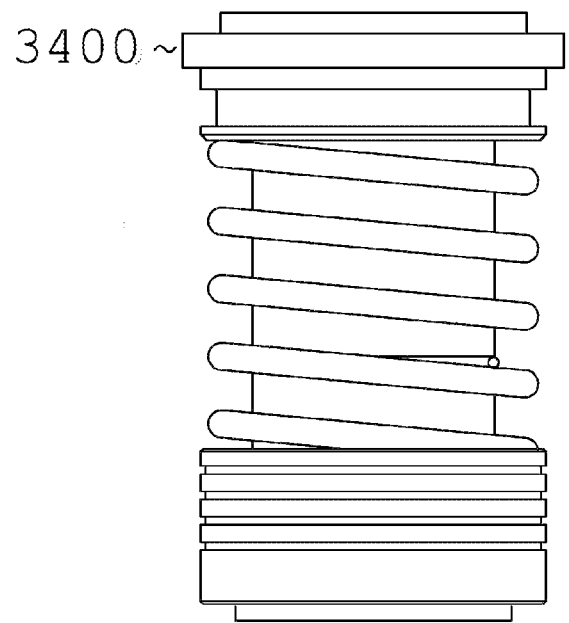
FIG. 34C shows an outside view of a valve assembly with a stepped retainer collar, according to an embodiment.

FIG. 34B shows a front view of a valve assembly that has a stepped retainer collar, according to an embodiment. FIG. 34C shows an outside view of a valve assembly with a stepped retainer collar according to an embodiment. The step 3400 is an integral part of the retainer collar formed with a larger diameter than the diameter of the retainer collar outer face 3401.

Figure 35:
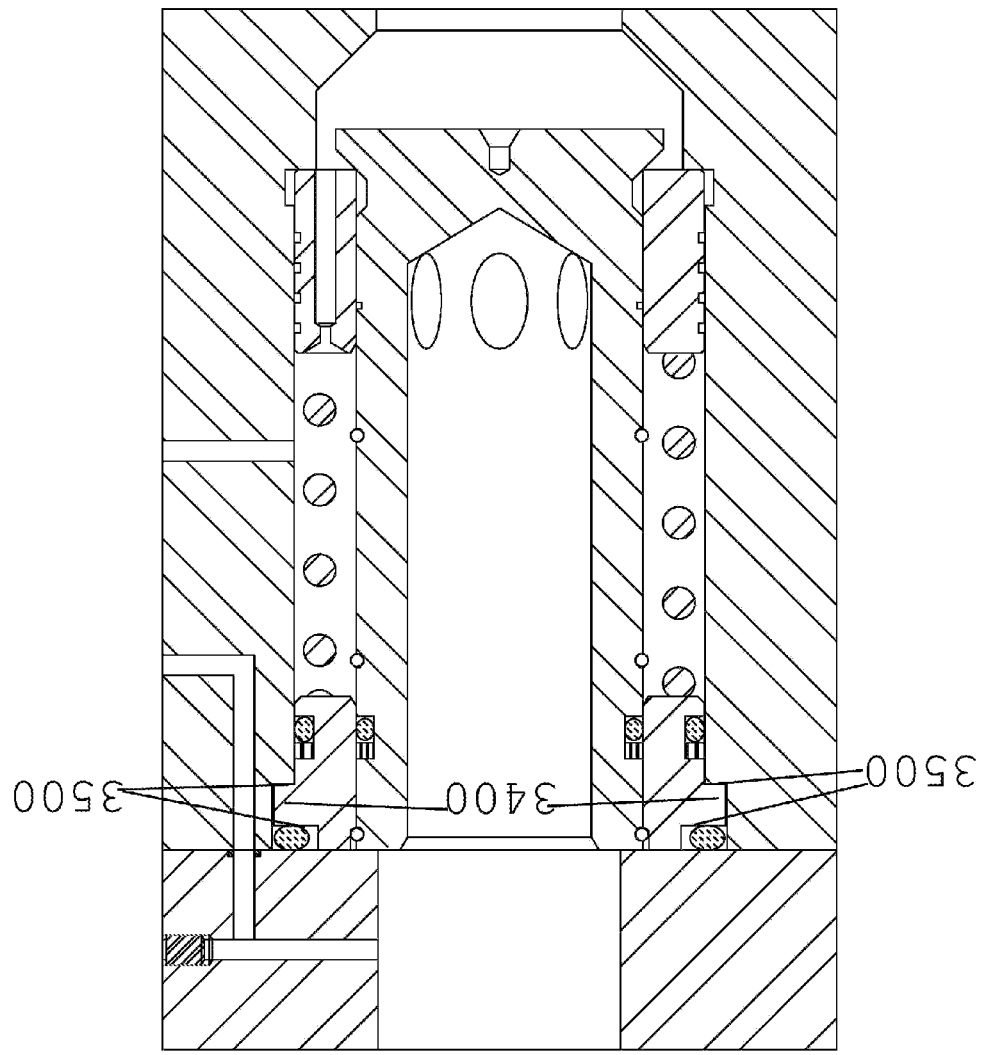
FIG. 35 shows a cross section of a slip-in valve assembly with a stepped retainer collar inside a body, according to an embodiment.

FIG. 35 shows a cross section of a slip-in valve assembly with a stepped retainer collar inside a body, according to an embodiment.

A mating recess 3500 is a recess (empty space) in the body to accommodate the step 3400 of the retainer collar. The mating recess 3500 should be of a size to accommodate the step 3400 without extra room. In practice, due to slight variations in the manufacturing process, there may be a very slight gap between the forward face of the step 3400 in the retainer collar (facing Face 0) and the opposing face of recess (for example between 0.005 and 0.010 inches). The mating recess 3500 extends beyond the opening in the body which accommodates the rest of the poppet. Thus, when fluid pressure is applied to the retainer collar, the step 3400 on the retainer collar (and located in the mating recess 3500) is pressed against the body in the direction towards the control sleeve (face 0) thereby blocking the retainer collar from moving in this direction. This prevents the retainer collar from urging the poppet off of its seat on the control sleeve.

Figure 36:
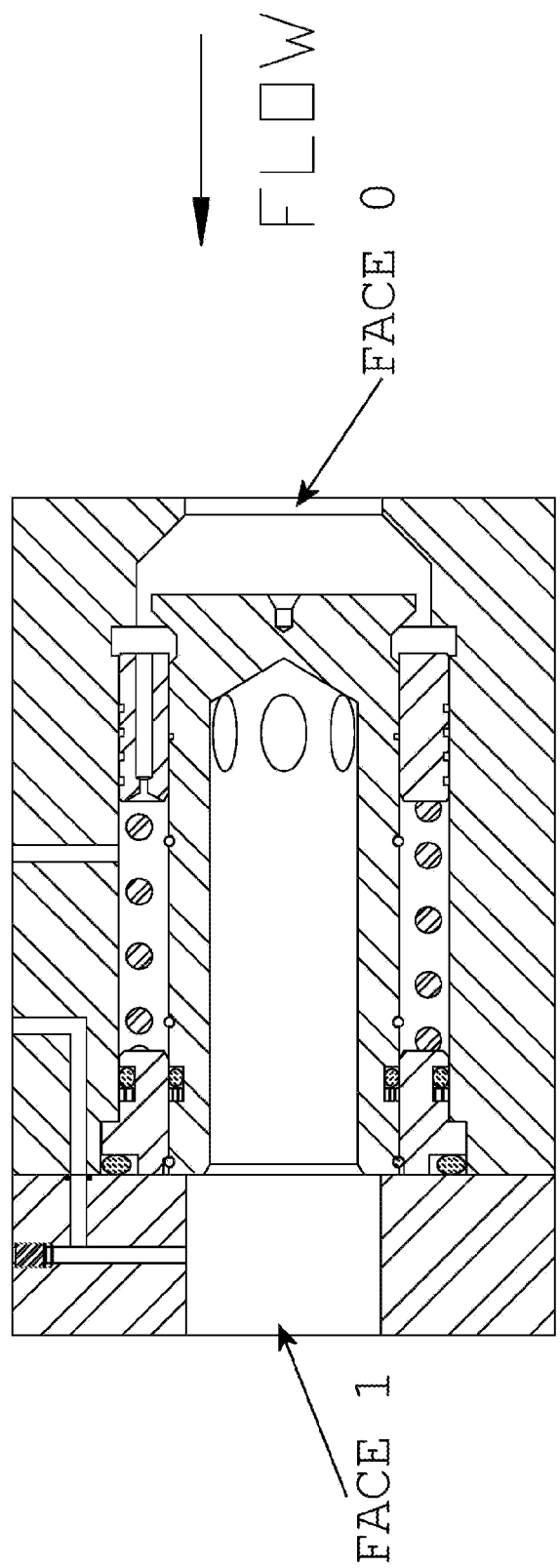
FIG. 36 shows a cross section of a slip-in valve assembly with a stepped retainer collar inside a body with forward flow, according to an embodiment.

FIG. 36 shows a cross section of a slip-in valve assembly with a stepped retainer collar inside a body with forward flow, according to an embodiment. In this embodiment with the stepped retainer collar, fluid can still flow from face 0 to face 1. However, because of the step 3400 in the retainer collar which fits into the mating recess, the flange body blocks the step 3400 from being able to move in the direction towards face 0 thus preventing fluid flow from face 1 to face 0.

Figure 37:
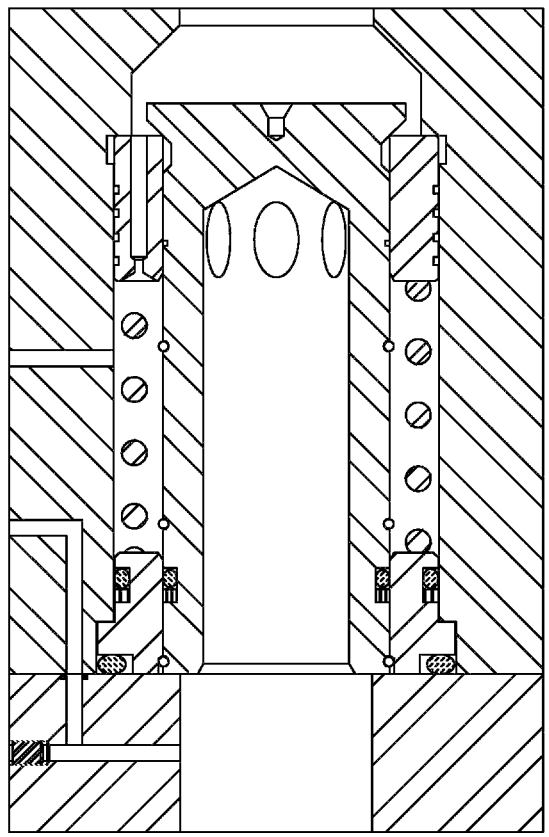
FIG. 37 shows a cross section of a slip-in valve assembly with a stepped retainer collar inside a body prohibiting reverse flow, according to an embodiment.

FIG. 37 shows a cross section of a slip-in valve assembly with a stepped retainer collar inside a body prohibiting reverse flow, according to an embodiment. Any fluid pressure on the retainer collar from the direction of face 1 towards face 0 will be absorbed by the flange body when the step 3400 in the retainer collar is positioned in the mating recess presses against the flange body. While the flange body serves to prevent movement of the step 3400 inside the flange body (thus securing the retainer collar), nevertheless a small amount of movement of the step 3400 is permissible.

Figure 38:
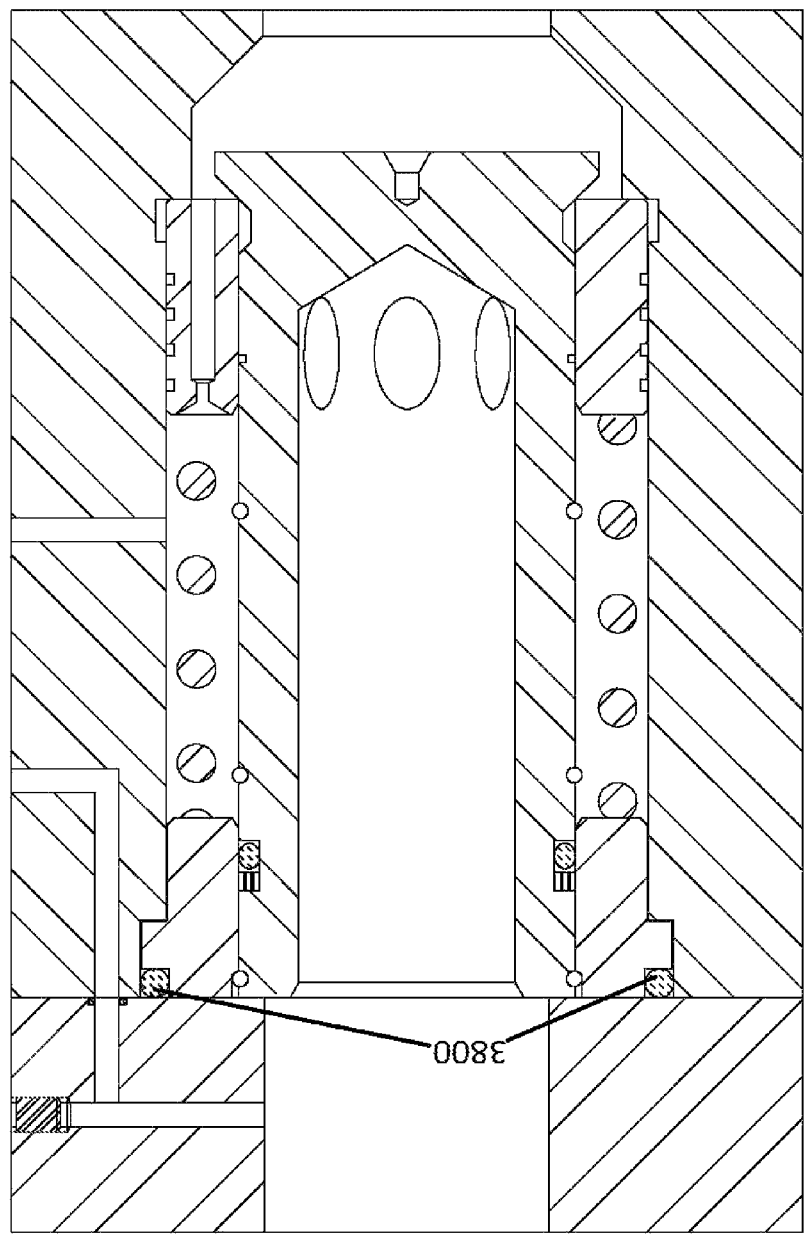
FIG. 38 shows a cross section of an alternate embodiment of a slip-in valve assembly with a stepped retainer collar without a recess on its outer diameter inside a body, according to an embodiment.

FIG. 38 shows a cross section of an alternate embodiment of a slip-in valve assembly with a stepped retainer collar without a recess on its outer diameter inside a body, according to an embodiment.

This embodiment is similar to the embodiment illustrated in FIG. 35, but unlike the embodiment shown in FIG. 35, here there is no recess in the outer diameter of the retainer collar. There is also no outer O-ring or O-ring back up ring.

In this embodiment, the face seal 3800 between the main valve body and the retainer collar also seals the outer diameter.

While O-rings and O-ring back up rings have been described and illustrated herein, it is noted that other types of structures can be used to serve the same purpose. For example, there are newer rubber compounds that are more extrusion resistant which may be used at higher pressures without using the O-ring back up ring. Also, there are circumferential seals that are not round in cross-section (e.g., Quad rings have a more square cross-section) which can also be used.

In addition, a GLYD RING can be utilized. A GLYD RING is typically made of low friction plastic material (such as Turcite) with an O-ring underneath it. The O-ring provides both sealing and pre-loads the GLYD RING against the sealing surface.

Figure 39:
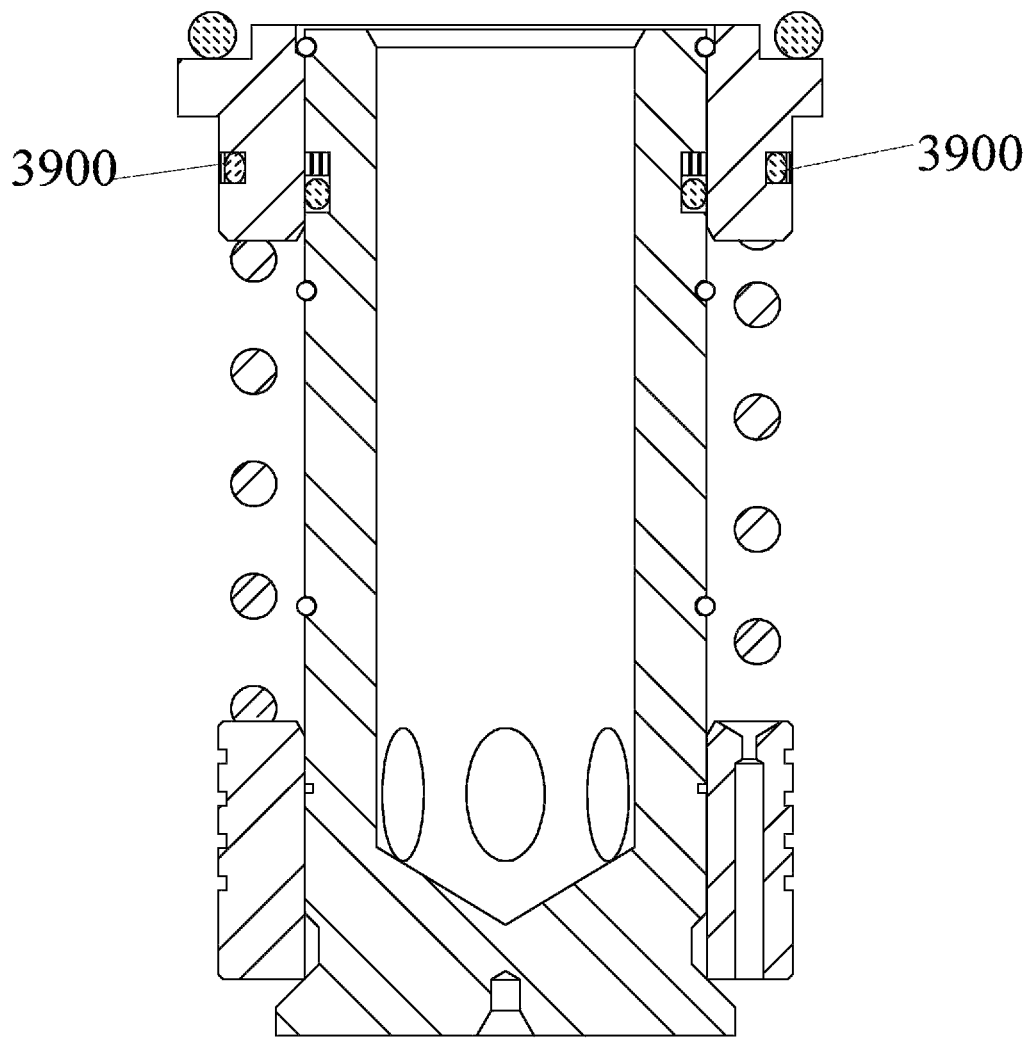
FIG. 39 shows a cross section of a slip in assembly utilizing a GLYD RING on the retainer collar, according to an embodiment.

FIG. 39 shows a cross section of an alternate embodiment of a slip in assembly utilizing a GLYD RING on the retainer collar, according to an embodiment.

An outer retainer GLYD RING 3900 is located in the outer recess of the retainer collar. The GLYD RING would typically be used in applications where there is relative motion, as the interface is low friction.

Figure 40:
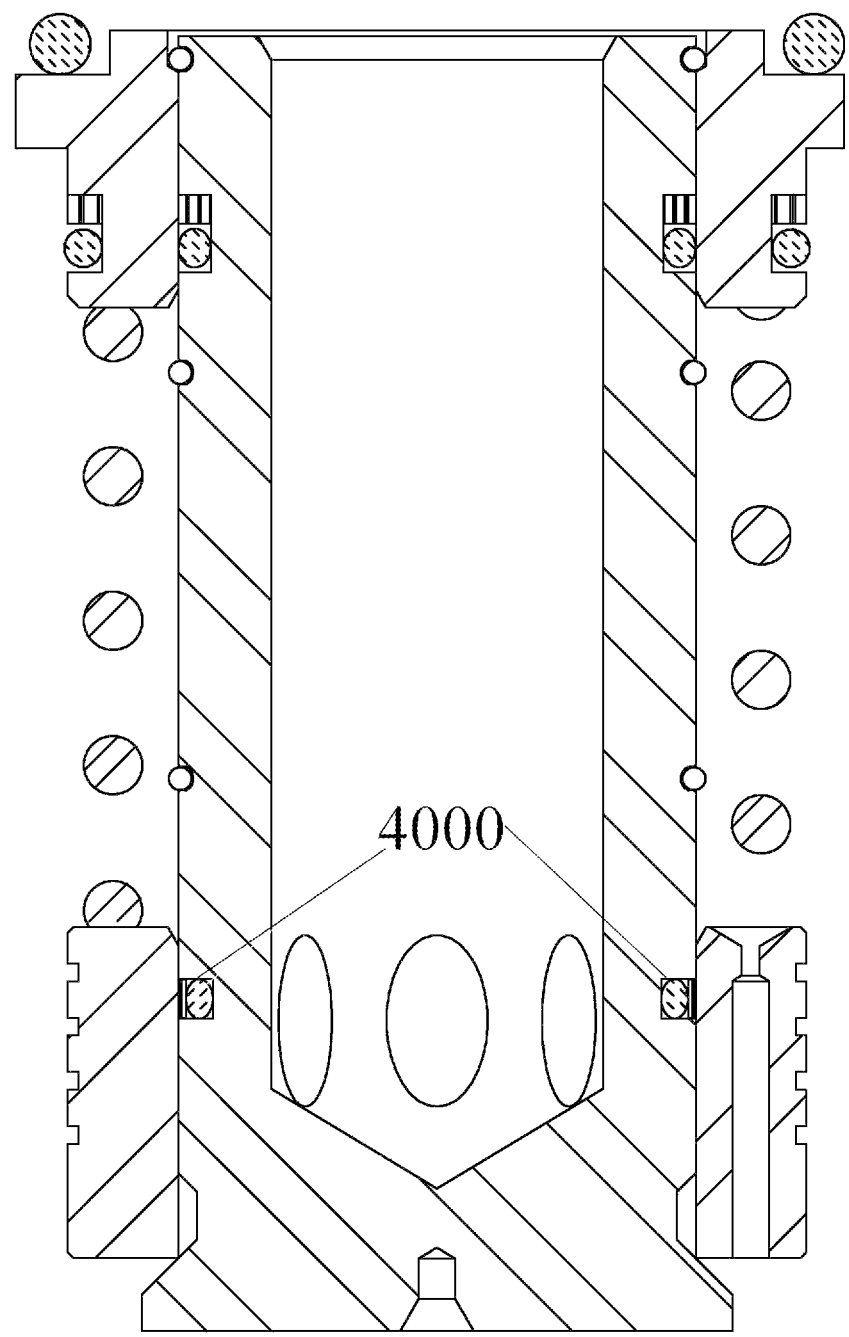
FIG. 40 shows a cross section of a slip in assembly utilizing a GLYD RING contained within the inside diameter of the control sleeve, according to an embodiment.

FIG. 40 shows a cross section of a slip in assembly utilizing a GLYD RING contained within the inside diameter of the control sleeve, according to an embodiment.

A control sleeve GLYD RING 4000 is located inside a recess on the outer diameter of the poppet behind the control sleeve. The lower friction Glyd Ring may be preferable to an O-ring as it would typically increase valve response time, and may improve valve hysteresis.

Figure 41:
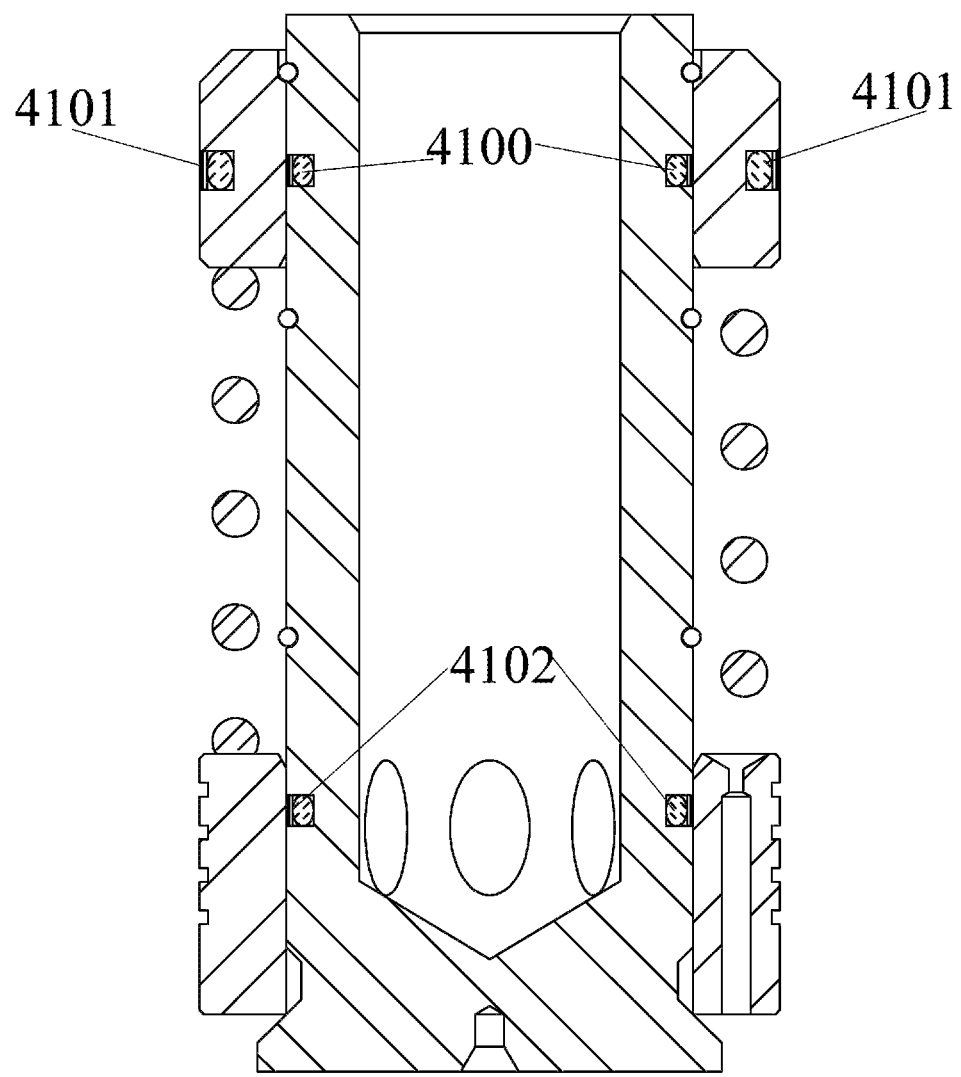
FIG. 41 shows a cross section of a slip in assembly utilizing GLYD RINGS on both the retainer collar and behind the control sleeve, according to an embodiment.

FIG. 41 shows a cross section of a slip in assembly utilizing GLYD RINGs on the retainer collar and behind the control sleeve, according to an embodiment.

In this embodiment, GLYD RINGS can be used at all seal locations, such as an inner retainer GLYD RING 4100 located in a recess on the outer diameter of the poppet behind the retainer collar, an outer retainer GLYD RING 4101 (same as outer retainer GLYD RING 3900) and a control sleeve GLYD RING 4102 (same as control sleeve GLYD RING 4000).

All features described and/or illustrated herein (or the absence of any such feature) can be combined with each other in any combination without limitation. For example, any embodiment described herein may or may not have a threaded end, may or may not have a retainer collar, may or may not have a passage in the control sleeve, etc. Any combination of feature(s) can be used without limitation with any other combination of feature(s). Any feature described herein can also be optional. The illustrations shown herein are exemplary but any illustration can be augmented with any feature described herein or any feature shown can also be removed without limitation.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A valve assembly, comprising:
    a tubular poppet comprising a first end, a second end opposite the first end, a hollow internal central region open at the first end and enclosed at the second end, and a poppet seat located at the second end;
    a hole set comprising at least one hole in the tubular poppet located towards the second end;
    a control sleeve attached to the second end, the control sleeve configured to slide between the second end towards the first end in an open position, wherein the open position configured such that at least a portion of the hole set is exposed creating an main flow channel between the central region and an outside region of the poppet through the hole set;
    a retainer collar positioned at the first end, the retainer collar comprising a step with a larger diameter than a retainer collar outer face; and
    a spring positioned around the tubular poppet and configured such that the spring naturally pushes the control sleeve towards the second end in a closed position so when the control sleeve is in the closed position the control sleeve circumferentially abuts the poppet seat which stops further movement of the control sleeve towards the second end forming a seal which extinguishes the main flow channel.

2. The valve assembly as recited in claim 1, further comprising:
    a body configured to house the tubular poppet, the body comprising an opening accommodating the tubular poppet and a mating recess of a size which fits the step in the retainer collar, the body comprising a surface adjacent to the step and the collar outer face of a structure preventing motion of the retainer collar towards the control sleeve.

3. The apparatus as recited in claim 1, further comprising:
    wherein an outside diameter of the spring at a particular location on the spring exceeds an outside diameter of a corresponding location on the tubular poppet.

4. The valve assembly as recited in claim 1, wherein the control sleeve further comprises a passage configured to enable flow through the control sleeve.

5. The valve assembly as recited in claim 1, wherein the tubular poppet comprises a poppet aperture and poppet orifice configured to enable flow through a body of the tubular poppet.

6. The valve assembly as recited in claim 1, wherein the control sleeve further comprises oil grooves location on an outside of the control sleeve.

7. The valve assembly as recited in claim 1, further comprising a control chamber, the control chamber being a region between an outside of the tubular poppet and an inside of the body.

8. The valve assembly as recited in claim 1, further comprising:
    an outer retainer ring made of plastic with an O-ring underneath located in an outer recess of the retainer collar.

9. The valve assembly as recited in claim 1, further comprising an outer O-ring positioned in a recess in the retainer collar.

10. The valve assembly as recited in claim 9, further comprising an O-ring back up ring positioned in the recess in the retainer collar.

11. The valve assembly as recited in claim 1, further comprising an inner O-ring located in a recess in the poppet adjacent to the retainer collar.

12. The valve assembly as recited in claim 11 further comprising an inner back up O-ring located in the recess in the poppet.

13. The valve assembly as recited in claim 1, further comprising:
   an inner retainer a ring made of plastic with an O-ring underneath located in a recess on the outer diameter of the poppet behind the retainer collar.

14. The valve assembly as recited in claim 13, further comprising:
   an outer retainer ring made of plastic with an O-ring underneath located in an outer recess of the retainer collar.

15. The valve assembly as recited in claim 1, further comprising:
   a control sleeve ring made of plastic with an O-ring underneath located inside a recess on an outer diameter of the poppet behind the control sleeve.

16. The valve assembly as recited in claim 15, further comprising:
   an outer retainer ring made of plastic with an O-ring underneath located in an outer recess of the retainer collar.

17. The valve assembly as recited in claim 15, further comprising:
   an inner retainer ring made of plastic with an O-ring underneath located in a recess on the outer diameter of the poppet behind the retainer collar.

18. The valve assembly as recited in claim 17, further comprising:
   an outer retainer ring made of plastic with an O-ring underneath located in an outer recess of the retainer collar.

* * * * *